(12) United States Patent (10) Patent No.: US 8,949,022 B1
Fahrner et al. (45) Date of Patent: Feb. 3, 2015

(54) CLOUD BASED ACTIVITY MONITOR FOR HUMAN POWERED VEHICLE

(71) Applicant: WI-MM Corporation, Santa Clara, CA (US)

(72) Inventors: Kevin Fahrner, Santa Clara, CA (US); Leslie Levitt, Santa Clara, CA (US); Pablo Echavarria, Santa Clara, CA (US)

(73) Assignee: WI-MM Corporation, Santa Clara, CA (US)

( * ) Notice: Subject to any disclaimer, the term of this patent is extended or adjusted under 35 U.S.C. 154(b) by 0 days.

(21) Appl. No.: 14/157,473

(22) Filed: Jan. 16, 2014

(51) Int. Cl.
*G06F 19/00* (2011.01)
*G01C 21/00* (2006.01)
*B60R 25/33* (2013.01)

(52) U.S. Cl.
CPC ........... *G01C 21/00* (2013.01); *B60R 2325/205* (2013.01); *B60R 25/33* (2013.01); *A63B 2225/20* (2013.01)
USPC ...................................... 701/433; 340/995.19

(58) Field of Classification Search
CPC ............. B60R 2325/205; B60R 25/33; A63B 2225/20; A63B 2225/50; H04W 4/00; G01C 21/26; G01C 21/32; B60G 2401/142; G06F 17/00; G08G 1/096741; G08G 1/096775; G08G 1/096811; G08G 1/096838
USPC ...................................... 701/433; 340/995.19
See application file for complete search history.

(56) References Cited

U.S. PATENT DOCUMENTS

| | | | | |
|---|---|---|---|---|
| 7,822,547 | B2* | 10/2010 | Lindroos | 701/433 |
| 8,130,678 | B2* | 3/2012 | Lee et al. | 370/255 |
| 2010/0184425 | A1* | 7/2010 | Lee et al. | 455/424 |
| 2010/0228405 | A1* | 9/2010 | Morgal et al. | 701/2 |
| 2013/0150028 | A1* | 6/2013 | Akins et al. | 455/427 |
| 2013/0325315 | A1* | 12/2013 | Beaurepaire | 701/400 |
| 2014/0035761 | A1* | 2/2014 | Burton et al. | 340/870.02 |
| 2014/0039804 | A1* | 2/2014 | Park et al. | 702/19 |

* cited by examiner

*Primary Examiner* — McDieunel Marc
(74) *Attorney, Agent, or Firm* — Womble Carlyle Sandridge & Rice LLP

(57) ABSTRACT

A device is provided. The device is an electronic device configured to attach to a human-powered vehicle. The electronic device is further configured to perform actions. The actions include producing position coordinates based on global positioning system data and coupling to a network via a wireless connection. The actions include relaying the position coordinates to the network via the wireless connection. In some embodiments the electronic device is integrated with a bicycle.

19 Claims, 11 Drawing Sheets

CLOUD BASED ACTIVITY MONITOR FOR HUMAN POWERED VEHICLE

BACKGROUND

Bicycles have long been touted as among the most efficient machines ever devised. Accessories for bicycles generally perform individual functions and are not well-integrated with other accessories. For example, theft prevention generally relies on mechanical locks, which are bulky and clumsy to attach and carry with a bicycle. Electronic speedometers for bicycles don't provide any theft prevention, and information from them is not readily downloaded to a user system for personal use. Global positioning system (GPS) components made for bicycles are easily stolen, separately or with the bicycle to which each is attached. Cell phones can be mounted to bicycles, but are likewise easily stolen separately or with the bicycle. Fleet managers for rental bicycles rely on manual record-keeping and credit card deposits from customers to ensure returns of bicycles. Therefore, in light of disparate challenges and the state of bicycle accessories today, there is a need in the art for a solution which overcomes the drawbacks described above.

SUMMARY

A device is provided. The device is an electronic device configured to attach to a human-powered vehicle. The electronic device is further configured to perform actions. The actions include producing position coordinates based on global positioning system data and coupling to a network via a wireless connection. The actions include relaying the position coordinates to the network via the wireless connection. In some embodiments the electronic device is integrated with a bicycle.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Embodiments of a bike GPS (global positioning system) device mounted to a bicycle, or other human-powered machine, transforming the bike into a cloud-connected platform that delivers immediate benefits to cyclists, bike manufacturers, and managers of bike sharing fleets. Bike performance analytics, theft prevention and location tracking are among the services and functions that the bike GPS device provides and supports. Various mountings are possible, with one embodiment mounting at the water bottle site on a bicycle frame, and one embodiment mounting into the bike frame, e.g., inside a frame tube. Versions of the bike GPS device feature various combinations of a processing engine with various functions, a GPS receiver, and one or more wireless communication units communicating via cellular telephone networks, machine-to-machine protocol, Bluetooth, Wi-Fi (wireless fidelity, also known as wireless local area network or WLAN), and/or a bike area network. Embodiments also feature various combinations of sensors, including an accelerometer, a gyroscope, an altimeter, a temperature sensor, a signal strength sensor, an air quality sensor, and bike and cyclist performance sensors such as a power meter, cadence monitor, heart rate monitor, speed sensor, etc. Some embodiments have a built-in display, battery management, and/or an alarm unit. These and further features, and operations thereof are discussed below, with reference to FIGS. 1-11. It should be appreciated that the bike GPS device may be referred to as a cloud based activity monitor for a bicycle as the device can support numerous functionality besides GPS functionality as described in more detail below.

Figure 1A:
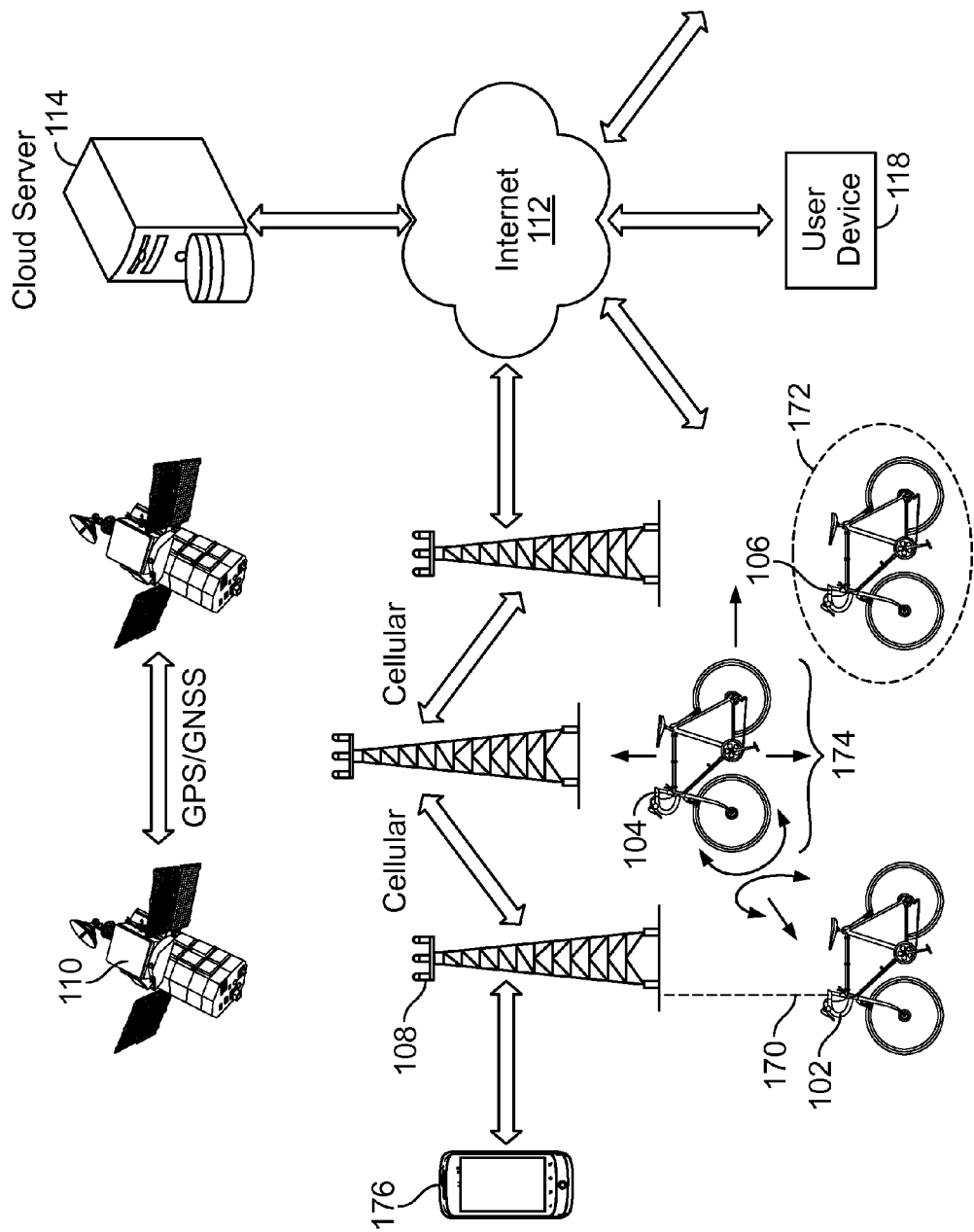
FIG. 1A is a system diagram, showing bicycles equipped with embodiments of the bike GPS (global positioning system) device, communicating position coordinates to a server via a cellular telephonic network and a global communication network in accordance with some embodiments.

FIG. 1A is a system diagram, showing bicycles 102, 104, 106 equipped with embodiments of the bike GPS device, communicating position coordinates to a server 114 via a cellular telephonic network 108 and a global communication network 112. The bike GPS devices are receiving global positioning system data from the global positioning system satellites 110 (part of the global navigation satellite system or GNSS), processing the GPS data to produce GPS-based position coordinates, collecting and processing further information relating to the bicycles 102, 104, 106, and relaying this information via a cellular telephonic network 108 to a cell phone 176, or via the cellular telephonic network 108 and a global communication network 112 to a cloud server 114 and/or a user device 118. Position coordinates can be applied by a bike GPS device, the cell phone 176, the cloud server 114, or the user device 118 for tracking a path 170 of the bicycle 102, or for establishing geo-fencing 172 of the bicycle 106 for theft prevention. One or more sensors, and data therefrom, can be applied by a bike GPS device, a cell phone 176, the cloud server 114, or the user device 118 for detecting and tracking acceleration, movement, angle, altitude or other motion-based aspects 174 of the bicycle 104. The bike GPS devices could also communicate with one another, for example on a group ride or for fleet management, or as part of a mesh network, with each bike acting as a node in a network. Further, each bike GPS device could communicate with other wireless devices on that particular bicycle, as part of a bike area network.

Figure 1B:
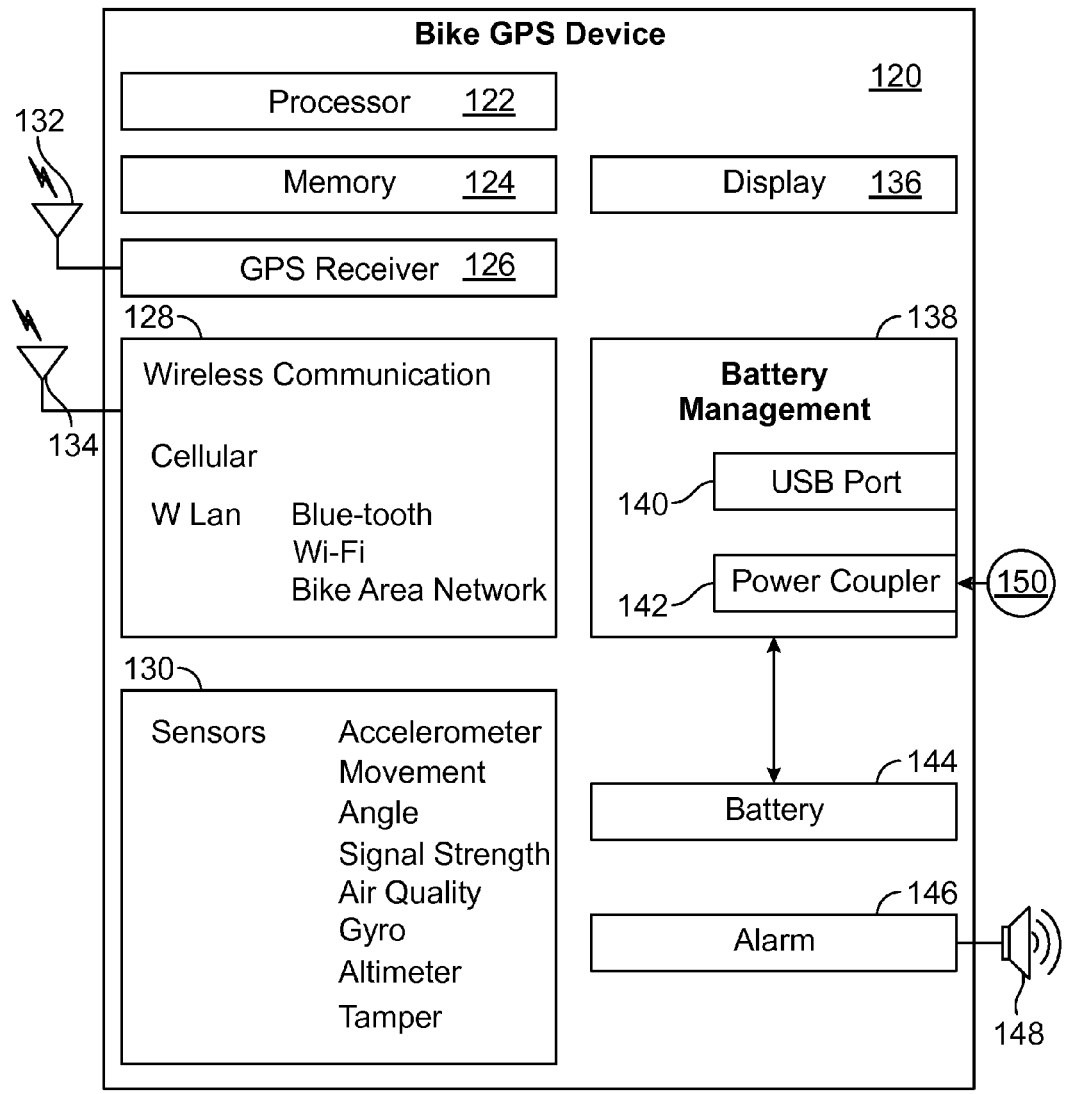
FIG. 1B is a block diagram of an embodiment of the bike GPS device of FIG. 1A in accordance with some embodiments.

FIG. 1B is a block diagram of an embodiment of the bike GPS device 120 of FIG. 1A. Further embodiments of the bike GPS device 120 could have fewer components, additional components, or some of the components could be integrated with one another. In the embodiment shown, the bike GPS device 120 has a processor 122 coupled to a memory 124, a GPS receiver 126, a wireless communication unit 128, sensors 130, a display 136, a battery management unit 138, a battery 144, and an alarm unit 146. In various embodiments, a processing engine is formed by the processor 122, the memory 124, and the contents of the memory 124, with the processor executing software resident in the memory 124. The processing engine, or a processing device, could include firmware, hardware, and software, in various combinations. In some embodiments, the processing engine, the processor 122, or a processing device is integrated with one or more of the remaining components, e.g., the GPS receiver 126, the wireless communication unit 128, a sensor 130, the battery management unit 138, or the alarm unit 146. For example, two or more components could be combined onto a single integrated circuit or a multichip module. Functions performed by the processing engine are further described below, in context of interactions among the components and various features.

The GPS receiver 126 is coupled to a GPS antenna 132, which receives GPS data from the GPS satellites 110. This GPS data is processed by the GPS receiver 126 to produce the position coordinates. The processor 122, which is coupled to the GPS receiver 126, can access the position coordinates and store them in the memory 124, and/or further process the position coordinates in order to perform various functions.

In various embodiments, the wireless communication unit 128 has one or more antennas 134, one or more receivers, and one or more transmitters, or one or more transceivers. For example, the wireless communication unit 128 could include a receiver, a transmitter, or a transceiver, for coupling to a cellular network, a wireless local area network (WLAN) such as Wi-Fi, a Bluetooth network, and/or a bike area network. In one embodiment, the wireless communication unit 128 communicates (i.e., transmits and/or receives) via a cellular telephonic network using a machine-to-machine protocol, which is generally less expensive than consumer voice and data plans. In one embodiment, the wireless communication unit 128 can switch between communicating via a cellular network and communicating via a wireless local area network, so as to take advantage of Wi-Fi hotspots. In some embodiments, the wireless communication unit 128 can communicate with other wireless devices on a bicycle using a bike area network. In other embodiments, the wireless communication unit 128 can communicate with Bluetooth devices, using a Bluetooth network. In another embodiment, the wireless communication unit 128 can communicate with other wireless devices in a wireless mesh network, e.g., by using Bluetooth, Wi-Fi, Zigbee, or other appropriate devices and protocols. In one embodiment, the wireless communication unit 128 arbitrates among multiple communication paths, devices and protocols, according to signal strength, cost of using a path, availability, type of information, or other factors appropriate to the communication. Arbitration could include an auto wakeup function upon detection of public Wi-Fi or other communication path.

In various embodiments, the sensors 130 could include various combinations of the following types of sensors. An accelerometer could provide acceleration data relating to acceleration in one, two or three dimensions. A movement sensor could provide data regarding movement generally or in specific directions or dimensions. For example, the movement sensor could be as simple as a ball-based tilt switch or a spring-loaded weight and a contact switch, or as complex as a micro-machined device with strain gauges and amplifiers and so on. An angle sensor could detect tilting or leaning of the bicycle. In some embodiments an accelerometer or gyroscope (or a combined device) covers all possibilities of sensors for position and movement, A signal strength sensor could detect the strength of the GPS signal or a wireless signal. An air quality sensor could detect various pollutants or other measures of air quality. In some embodiments a gyroscope, which could be laser-based, solid-state, mechanical or some combination thereof, could detect angular displacement in various axes, directions and dimensions. In alternative embodiments the accelerometer/gyroscope is a single Application Specific Integrated Circuit. An altimeter could provide data for tracking altitude. A tamper sensor could include various switches mounted for detection of opening of the case or housing of the bike GPS device 120, or removal of the bike GPS 120 from the bicycle or other human-powered vehicle. The tamper sensor could also include a proximity sensor, for detecting presence of an intruder.

A display 136 could be integrated with a case or housing of the bike GPS device 120, integrated with a frame of the bicycle, or mounted to the bicycle in a location differing from the mounting of the bike GPS device 120, for example on the frame or on the handlebars. The display 136 could be connected wirelessly to the bike GPS device 120, for example using the bike area network, or could connect via wires to the bike GPS device 120. In some embodiments, the display 136 is integral with the bike GPS device 120, and in other embodiments, the display 136 is considered external to, or an accessory to, the bike GPS device 120. The processing engine could employ the display 136 for various user interfaces, such as graphical user interfaces or text-based user interfaces. In some embodiments, the display 136 includes a touchscreen.

The battery management unit 138 manages the battery 144, and together these provide power for the various electrical and electronic components of the bike GPS device 120. In some embodiments, the battery 144 can be charged via a USB (Universal Serial Bus) port 140 of the battery management unit 138. In some embodiments, the battery 144 can be charged via a power supply 142, which can be coupled to a hub dynamo 150. In some embodiments, the power supply 142 can be coupled to energy harvesting devices, which could include a device harvesting energy from foot pressure on each bicycle pedal, or a generator or dynamo coupled to the bicycle wheel, pedal, cranks, or to other portions of the bicycle. The power supply 142 could be coupled to a solar panel, a small windmill generator, or other alternative energy devices. The power supply 142 could be coupled to a fuel cell, or an external battery, in some embodiments. Some bicycles may be equipped with an electric system for electric shifters and/or lights, and embodiments of the power supply 142 could hook into such an electric system, e.g., by a charging plug. In further embodiments, the battery management unit 138 could manage lighting, such as a headlight, and/or taillight, and could adjust lighting based on the available amount of energy in the battery and ambient light conditions 144. For example, the battery management unit 138 could provide a "get home light" control of the headlight and/or taillight, dimming, modulating or flashing one or both of these to conserve battery energy.

The alarm unit 146 provides an audible and/or visible indication that an alarm situation is occurring. In some embodiments, the alarm unit 146 is coupled to a buzzer 148, to produce an alarm sound. The alarm unit 146 could be configured or programmed to produce an alarm sound unique to each bike GPS device 120, or personalized for the user, a group of bicycles, or a fleet of bicycles. For example, an alarm wave form file or other arrangement of data could be downloaded through the wireless communication unit 128 into the memory 124, then played back via the processor 122, through the alarm unit 146, and out via the buzzer 148. In further embodiments, the alarm unit 146 could activate a flashing light, or physical impediments to theft, e.g., activating the bicycle brakes, issuing an electric shock or rendering gear shifting inoperable.

Figure 1C:
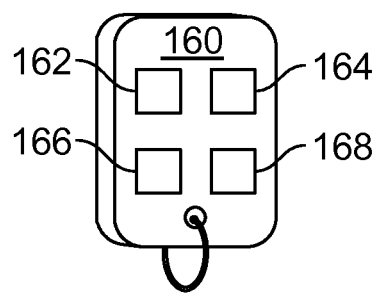
FIG. 1C is a perspective view of a wireless key fob, which activates and deactivates an alarm function of the bike GPS device of FIGS. 1A and 1B in accordance with some embodiments.

FIG. 1C is a perspective view of a wireless key fob 160, which activates and deactivates an alarm function or other functions of the bike GPS device 120 of FIGS. 1A and 1B. In various embodiments, the wireless key fob 160 or other wireless handheld device could operate via a Bluetooth network, and communicate to the wireless communication unit 128, or could operate via another wireless channel, protocol or device, to issue commands to activate or deactivate the alarm function or other functions. The key fob could act as a proximity sensor to automatically activate or deactivate functions. Various buttons 162, 164, 166, 168 on the wireless key fob 160 could perform fixed or programmable functions. A wireless handheld device could include an embodiment of the wireless key fob 160 that lacks the key ring but otherwise has similar features and functions, or is in some other shape. In some embodiments, a wireless handheld device could include a cell phone or other cellular telephonic device.

For example, a first button 162 of the wireless key fob 160 could activate a geo-fencing function of the bike GPS device 120. A second button 164 could deactivate the geo-fencing function. A third button 166 could activate a tracking function of the bike GPS device 120. Tracking could be turned off by pressing the same third button 166, or by pressing the second button 164, or by another mechanism. A fourth button 168 could activate the alarm unit 146, e.g., as a panic button. The buttons 162, 164, 166, 168 could be reprogrammed by downloading configuration information through the wireless communication unit 128 to the memory 124 of the bike GPS device 120.

With reference to FIGS. 1A-1C, various functions and features can be implemented in embodiments of the bike GPS 120. These functions and features can operate in just the bike GPS device 120 alone, or in the bike GPS device 120 in combination or cooperation with a cellular telephonic device such as the cell phone 176, a server such as the cloud server 114, and/or the user device 118.

One function the system described herein is capable of executing is to track a path 170 of a bicycle 102. The path 170 as shown in FIG. 1A is reduced in size for purposes of illustration. The processor 122 could read in position coordinates from the GPS receiver 126, and store a series of these position coordinates in the memory 124, or relay the position coordinates via the wireless communication unit 128 to the cell phone 176, the cloud server 114, or a user device 118. The connection to the global communication network 112 could be made via the cellular telephonic network 108, e.g., using a portal, or via a wireless local area network such as Wi-Fi, e.g., at a Wi-Fi hotspot coupled to the Internet. Tracking could be initiated manually, for example by the user pressing a button coupled to the processor 122, touching a touchscreen of the display 136, or sending a command via a wireless device and the wireless communication unit 128. Or, tracking could be initiated automatically, for example by having a movement sensor, an accelerometer, or a gyro, or a change in GPS-based position coordinates, trigger, via the processor 122, a start of a tracking process implemented by the processing engine. Tracking could be initiated by turning on the bike GPS device 120, in some embodiments, with position coordinates gathered at idle discarded. In some embodiments, each position coordinate is accompanied by a timestamp, so that the path tracking function can provide a record of position and time. Speed or velocity can be calculated, so that the tracking could be displayed along with color coding or other coding indicating speed or velocity as well as position. These calculations and display renderings could be performed by the processor 122 locally to the bike GPS device 120, for presentation on the display 136 or sending to a network, or could be calculated by the cell phone 176, the cloud server 114, or the user device 118.

One function is to provide geo-fencing 172, for example for theft prevention. In theft prevention, the user would activate the geo-fencing 172 function, by employing the wireless key fob 160 or by a mechanism similar to activation of tracking. The processor 122 would read from the GPS receiver 126 the present location of the bike GPS device 120 and bicycle to which the device is attached, and derive position coordinates for a circular radius or other shaped boundary around the bike GPS device 120. This boundary could be larger or smaller than shown as geo-fencing 172 in FIG. 1A, and may depend upon resolution of GPS coordinates and accuracy of the GPS receiver 126. The processor 122 would then monitor the location of the bike GPS device 120, and compare this location to the established position coordinates for the boundary. If the location of the bike GPS device 120 is not within this boundary, the processor 122 can conclude that the bike GPS 120 and the bicycle are outside of the geo-fencing 172. Under such circumstances, the processor 122 can then activate the alarm unit 146 and/or send an alarm notification via the wireless communication unit 128 to any of the networks or devices discussed above regarding tracking.

Various further functions relating to geo-fencing can be devised. For example, multiple geo-fencing zones can be created, based on position coordinates from the bike GPS device 120 or from a map. A user could specify a home address as one such geo-fencing zone, and apply this towards theft prevention functions. A fleet owner could specify a business address as a center of a geo-fencing zone, or draw a larger boundary on a map for establishing limits of where rental bicycles are allowed to go. Another use of geo-fencing is tethering. For example, a parent could establish a geo-fencing around a current position coordinate of the bicycle which the parent is riding (i.e., a moving or relative geo-fencing). The cloud server 114 could track the current position coordinate of the parent's bicycle, with the moving geo-fencing, and also track the current position coordinate of a child's bicycle, from a bike GPS device 120 attached to the child's bicycle. If the cloud server 114 detects that the current position coordinate of the child's bicycle is outside of the moving geo-fencing, i.e., the child and bicycle have strayed too far away from the parent and bicycle, the cloud server 114 could respond by sending a text message to a cell phone 176 of the parent, or another notification as readily devised. Variations of moving geo-fencing, and tracking in general, could be applied to group rides or buddy rides, or bicycle races.

One function is to provide sensor data and interpretation, for example for various types of monitoring and tracking. Inputs from an accelerometer, a movement sensor, an angle sensor, a gyro, or an altimeter could be read in by the processor 122, which could perform various calculations and then store or transmit the raw or processed information via the wireless communication unit 128 to any of the networks or devices discussed above regarding tracking. Or, the processor 122 could perform renderings and send output to the display 136. For example, a detailed animation rendering of the motion of the bicycle could be presented, e.g., as an overlay to the path-tracking. This can include angle information such as tilt or yaw of the bicycle. Sensors could be calibrated for different mountings or locations of the bike GPS device 120, e.g., on differing frame members of the bicycle. Information from the sensors could be processed to guard against theft. For example, if the user has not activated tracking, or has activated an alarm function, the processor could interpret motion of the bicycle as indicative of a theft event. This could trigger an alarm, via the alarm unit 146, or transmission of event information via the wireless communication unit 128 as above. Motion detection could operate in combination with geo-fencing, or independent of it, for theft prevention or other purposes.

Another function is to provide performance tracking or information. For example, various sensors could track rate of pedaling, steepness of ascent or descent, altitude changes, distance and time (or speed or velocity), and the processor 122 could derive calories consumed, amount of energy produced by the rider, recommendations for water stops, rest stops, or interval training, and comparisons to previous rides. As above, these trackings or calculations could be performed in the bike GPS device 120, or the information could be relayed wirelessly as described in the tracking function, for calculation or tracking at a server, e.g., the cloud server 114, and/or on various devices. One example would be to combine altitude information from an altimeter (one of the sensors 130), with position coordinates from the GPS receiver 126, for three-dimensional path tracking, e.g. of bicycle rides in hill or mountain territory.

Various further functions, combining aspects of the above descriptions, are readily devised in accordance with the teachings disclosed herein. For example, readings from air quality sensors (of the sensors 130) from one or more bike GPS devices 120 could be transmitted along with position coordinates via the wireless communication units 128, to the cloud server 114. This would allow ongoing pollution and air quality monitoring along popular bicycle paths or other routes, which could be displayed as an overlay to a map. Bicyclists on a group ride could keep track of straggling riders and arrange to wait for them, using a variation of geo-fencing and communicating via a wireless mesh network or via a cellular telephonic network 108. Bicycle rider traffic patterns could be monitored. The path or location of a stolen bicycle could be determined. The path or location of bicycles loaned or rented out from a fleet can be determined. Carbon offsets can be determined. Metrics that can be derived from the GPS-based position coordinates and sensor data include, but are not limited to, calories, distance traveled, carbon offset, paths, speed, time, elevation, reports, maps, and diagnostics.

Figure 2A:
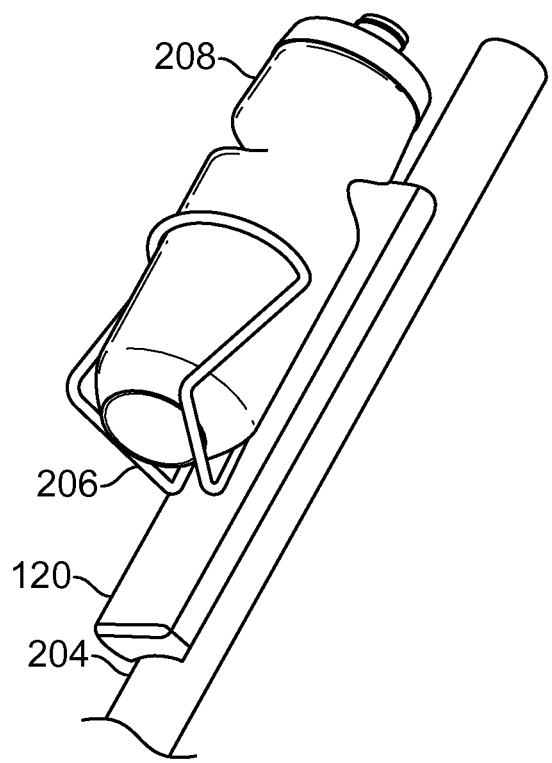
FIG. 2A is a perspective view of an embodiment of the bike GPS device attached to a water bottle mount of a bicycle frame in accordance with some embodiments.

FIG. 2A is a perspective view of an embodiment of the bike GPS device 120 attached to a water bottle mount 206 of a bicycle frame 204. The water bottle mount 206 holds a water bottle 208, which is removable for quenching thirst of a rider. In the embodiment shown, the bike GPS device 120 fits between the water bottle 208 and the bicycle frame 204, when the water bottle 208 is in place in the water bottle mount 206. Various versions of water bottle mounts 206 and cases for the bike GPS device 120 are readily devised, to fit various bicycle frames 204. For example, some bicycle frames 204 are equipped with threaded lugs, to which regular water bottle mounts are readily attached, e.g., with threaded fasteners. Other bicycle frames 204 lack these threaded lugs, and other types of water bottle mounts have clamps or other fittings for attaching to such bicycle frames 204. The bike GPS device 120 could attach first to the bicycle frame 204, with the water bottle mount 206 then attaching to the bike GPS device 120. Or, the water bottle mount 206 could attach to the bicycle frame 204, sandwiching the bike GPS device 120 between the water bottle mount 206 and the bicycle frame 204. The water bottle mount 206 could attach to the bicycle frame 204, and the bike GPS device 120 could attach to the water bottle mount 206, and so on. Generally, in variations of the embodiment shown in FIG. 2A, a housing of the bike GPS device 120 attaches to the frame 204 of the bicycle, for example by attaching to a water bottle mount, and a water bottle can be attached to the housing, such as by securing the water bottle to the water bottle mount. In some embodiments, the water bottle mount is integrated with the bike GPS device 120, and in some embodiments the water bottle mount is integrated with the bicycle frame 204.

Figure 2B:
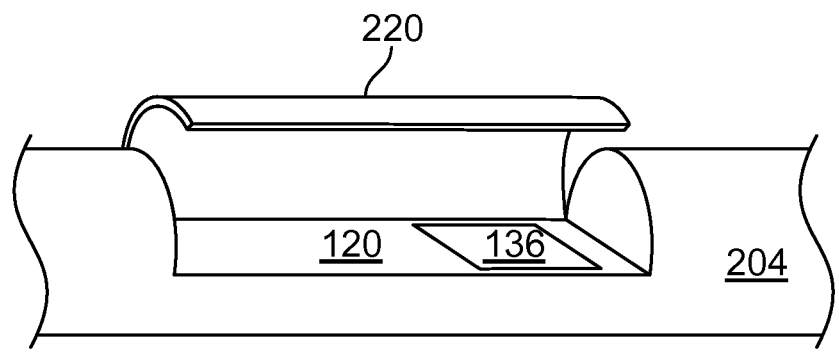
FIG. 2B is a perspective view of an in-frame mounting of an embodiment of the bike GPS device, featuring a hatch.

FIG. 2B is a perspective view of an in-frame mounting of an embodiment of the bike GPS device 120, featuring a hatch 220. This embodiment makes use of a modification to the bicycle frame 204, which could be included in a manufacturing process of a bicycle, or performed as an aftermarket modification of the bicycle. Here, the bike GPS device 120 is installed inside the frame 204, for example inside a cross tube or a down tube of the bicycle. A hatch 220 can open for access to the bike GPS device 120, and close to seal the bike GPS device 120 inside and protect from rain and other weather conditions. For example, there may be a seal around the edge of the hatch 220 or around the otherwise exposed edges of the frame 204 to which the hatch 220 contacts. In the embodiment shown, the bike GPS device 120 includes an integral display 136. Further embodiments may lack the display 136. The hatch 220 could be made of an optically transparent material, or an optically translucent or opaque material. In any case, the hatch 220 should be made of a material having radiowave transparency, so that the wireless communication to and from the bike GPS device 120 is possible. The hatch 220 could be considered a portion of the bicycle frame 204.

Figure 2C:
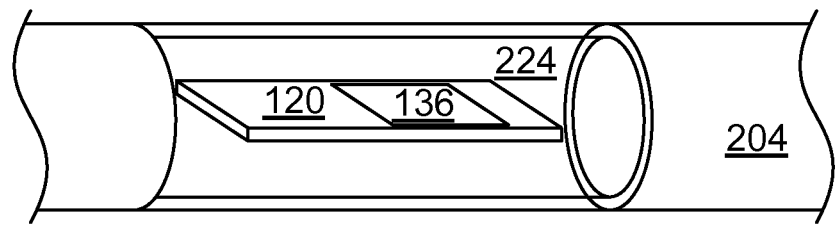
FIG. 2C is a perspective view of a further embodiment of an in-frame mounting of the bike GPS device.

FIG. 2C is a perspective view of a further embodiment of an in-frame mounting of the bike GPS device 120. Here, the bike GPS device 120 is installed in a portion of the frame having radio transparency. For example, a tubular section 224 of optically transparent and radiowave transparent material could be spliced into the frame 204, sealing a bike GPS device 120 in place. Fiberglass and other nonmetallic, composite materials may be suitable for such a material, for part of a bicycle frame or even an entire bicycle frame. Access to the bike GPS device 120, for example for charging, could be arranged through one or more holes drilled through the tubular section 224. Or, the bike GPS device 120 could have a small solar panel, and be completely sealed. Further mechanisms for accessing the bike GPS device 120 in order to charge, service or replace the device, such as by sliding the device further down the tube to an access port, are readily devised in accordance with the teachings herein. Inductive charging could also be applied.

Figure 3:
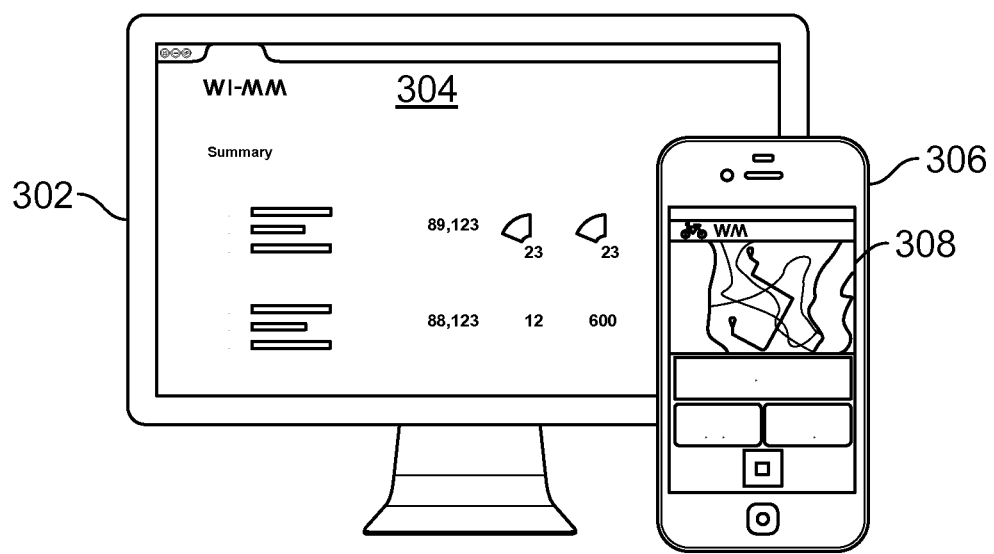
FIG. 3 is a front view of graphical user interfaces used in communication with the bike GPS device in accordance with some embodiments.

FIG. 3 is a front view of graphical user interfaces 304, 308 used in communication with the bike GPS device. A first graphical user interface 304 is shown on a display monitor 302, for example as coupled to the user device 118 of FIG. 1A, e.g., a computing device coupled to a network. Performance data, including position coordinates, is relayed from the bike GPS device 120 to the graphical user interface 304, by one or more of the paths and mechanisms discussed above. For example, the data could be sent via a Wi-Fi hotspot coupled to the Internet, to the user device 118, or to the server 114 and then to the user device 118, or via a cellular telephonic network 108 and a portal to the Internet, and thence to the user device 118 or to the server 114. The graphical user interface 304 could display information such as calories burned by the rider, distance traveled, average speed, maximum speed, total distance ridden including previous rides, distance for this ride, total altitude gained in this ride (e.g., the sum of all the hills climbed), net altitude gained in this ride (e.g., the difference between the altitude at the end and the altitude at the start), and so on.

A second graphical user interface 308 is shown on a display of a cell phone 306. Performance data, including position coordinates, is relayed from the bike GPS device 120 to the graphical user interface 308, by one or more of the paths and mechanisms discussed above. For example, the data could be sent via the cellular telephonic network 108, or via one of the above mechanisms to the cloud server 114 and thence via the Internet to an internet-enabled cell phone, and so on. The graphical user interface 308 could display the path 170 ridden by the bicyclist, along with the current location of the bike GPS device 120 and bicycle, overlaid on a map of the region, at various scales, along with time, distance and speed information. Either of the graphical user interfaces 304, 308, or others, could display either of the presentations shown, or others, as readily devised in accordance with the teachings herein.

Figure 4A:
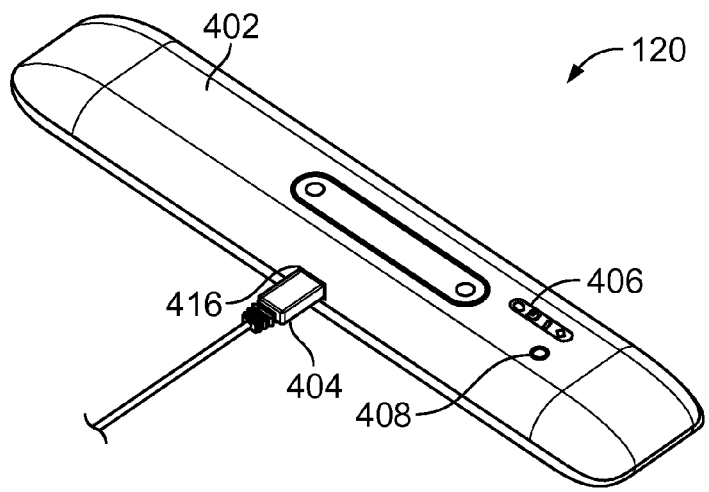
FIG. 4A is a perspective view of an embodiment of the bike GPS device, featuring a case in accordance with some embodiments.

FIG. 4A is a perspective view of an embodiment of the bike GPS device 120, featuring a case 402. The case 402 has a USB port 416, into which a USB plug 404 can be inserted in order to charge the battery 144 of the bike GPS device 120. The case 402 also has LEDs (light emitting diodes) 406, which illuminate for various functions, and a button 408, which can be pressed to turn the device on and off.

Figure 4B:
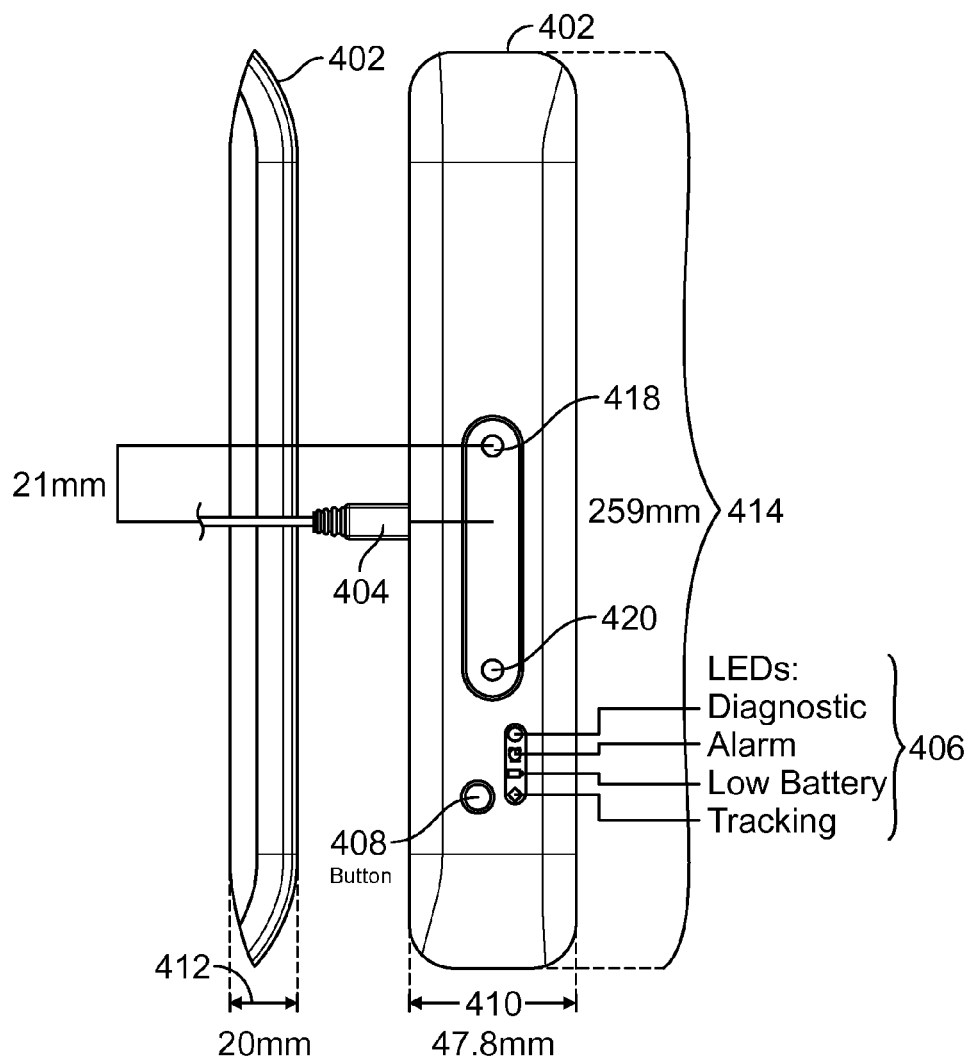
FIG. 4B is a combination side view and top view of the case of the bike GPS device of FIG. 4A in accordance with some embodiments.

FIG. 4B is a combination side view and top view of the case 402 of the bike GPS device 120 of FIG. 4A. Electronics of the bike GPS device 120 are inside of the case 402. The USB plug 404 is shown inserted into a side of the case 402. The LEDs 406 include lamps that illuminate for each of diagnostic, alarm, low battery, and tracking functions. In the embodiment shown, the case 402 has a length 414 of 259 mm, a width 410 of 47.8 mm, and a thickness 412 of 20 mm. In this embodiment, the case has a width approximately equal to a width of a bicycle frame tube, and a length longer than the width. The thickness of this embodiment is thinner than the width. These or comparable dimensions provide ready mounting for the bike GPS device 120 to a bicycle frame 204, so that the bike GPS device 120 does not interfere with the pedals or other parts or operation of the bicycle. Such a thickness, in the context of such a width, provides ready mounting for the bike GPS device between a water bottle 208 and the frame 204. Apertures 418, 420 through the case 402 allow fasteners to pass through the case 402, in order to attach the case 402 to the frame of the bicycle. In the embodiment shown, the spacing of the apertures 418, 420 is equal to the spacing of corresponding apertures on a water bottle mount, so that fasteners passing through the apertures of the water bottle mount can then pass through the apertures 418, 420 of the case 402, and these fasteners can then attach to the threaded lugs on the frame of the bicycle at the frame location for the water bottle mount.

Figure 4C:
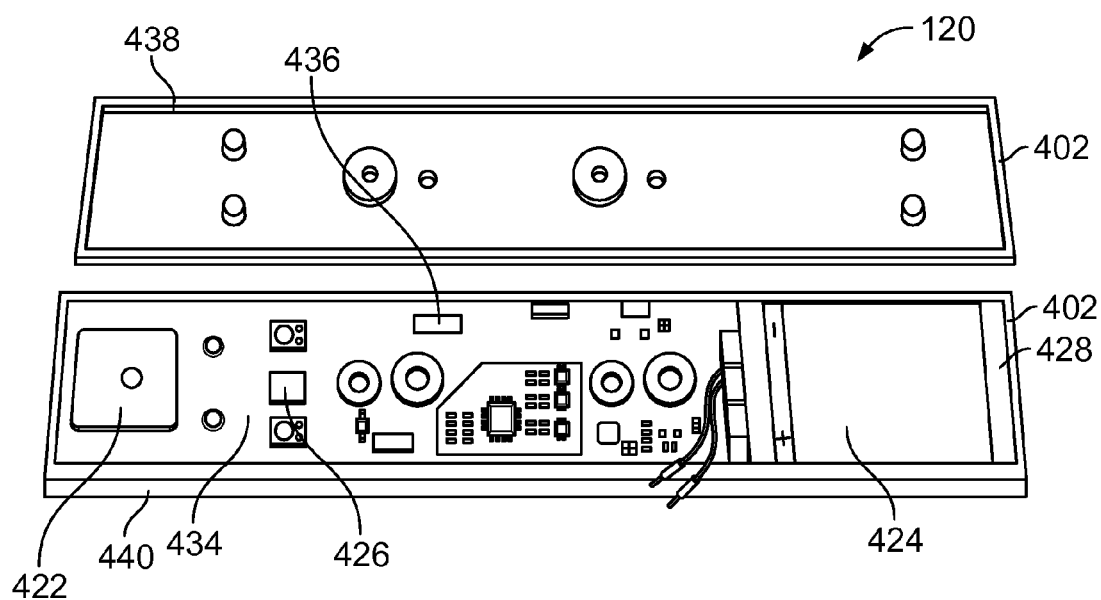
FIG. 4C is a perspective view of a populated printed circuit board of an embodiment of the bike GPS device.

FIG. 4C is a perspective view of a populated printed circuit board 434 of an embodiment of the bike GPS device 120. The printed circuit board 434 is held inside the two halves 438, 440 of the case 402. On the printed circuit board 434, a GPS antenna 422 and a cellular antenna 428 are at opposed ends. Mounting these antennas at opposed ends minimizes interference between the antennas. In one embodiment, the GPS antenna 422 is above the water bottle 208 (see FIG. 2A), so as not to be in the radio frequency "shadow" of water. In further embodiments, antennas external to the case 402 could be employed. In one embodiment, the frame of the bicycle, or a portion thereof, is used as an antenna. A battery 424 is located at one end of the printed circuit board 434, near and inboard of the cellular antenna 428. A GPS receiver 426 is mounted at one end of the printed circuit board 434, near and inboard of the GPS antenna 422. A Bluetooth module 436 is mounted approximately in the middle of the printed circuit board 434, along one edge. Other components mounted to the printed circuit board include a microcontroller, an accelerometer, a battery fuel gauge and a charging circuit. In this embodiment, the microcontroller includes the processing engine.

Figure 4D:
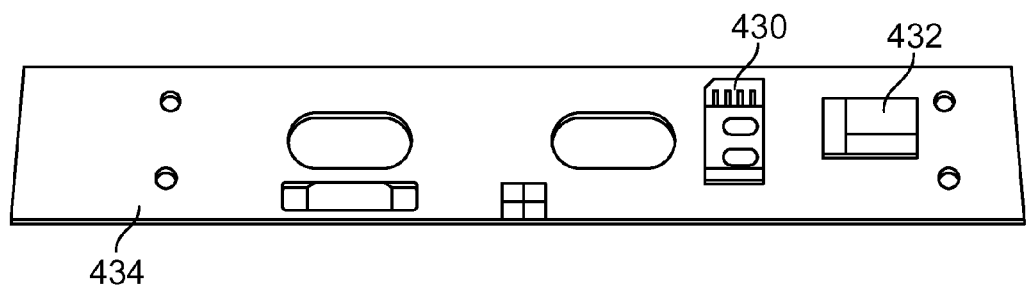
FIG. 4D is a bottom view of the populated printed circuit board of the bike GPS device of FIG. 4C in accordance with some embodiments.

FIG. 4D is a bottom view of the populated printed circuit board 434 of the bike GPS device 120 of FIG. 4C. A combination cellular radio and modem (modulation demodulation unit) 432 is mounted at one end of the printed circuit board 434, near the cellular antenna 428. A SIM (subscriber identity module) card 430 is mounted next to the cellular radio and modem 432. The SIM card 430 can be used with a GSM (Global System for Mobile Communications) module, or could be internal to a CDMA (code division multiple access) module. Variations of the cellular communication devices, and other devices for the printed circuit board 434, and other types of printed circuit boards or mechanisms for connecting circuitry, are readily devised.

Figure 5:
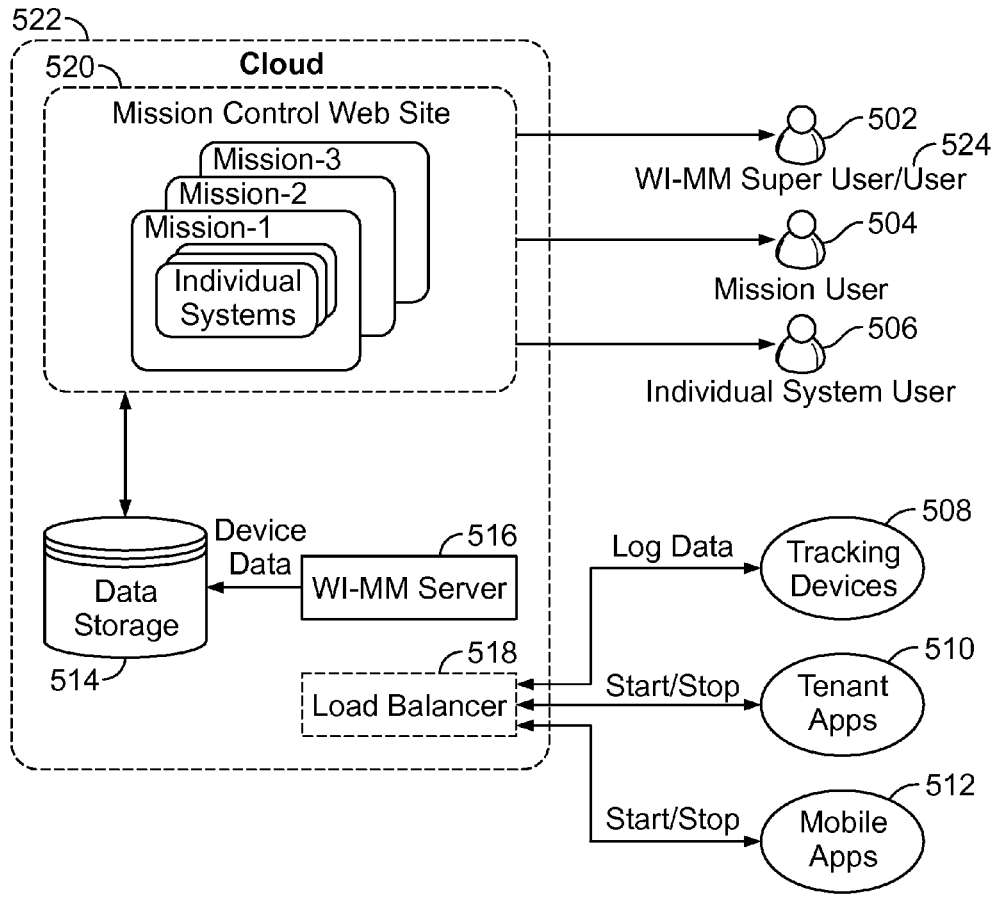
FIG. 5 is a system diagram of a cloud service provider communicating with users, applications, and devices of the bike GPS device in accordance with some embodiments.

FIG. 5 is a system diagram of a cloud service provider 522 communicating with users 502, 504, 506, 524, applications 510, 512, and devices 508 of the bike GPS device 120. With reference back to FIG. 1A, the system shown in FIG. 5 can be implemented using the cloud server 114, with one or more physical servers, or virtual servers operating in a virtual computing environment with physical device allocations to support the virtual devices. For example, one or more of these servers could be hosting the mission control website 520, and tracking various missions, e.g. Mission-1, Mission-2, and Mission-3 as depicted in the mission control website 520. The mission control website 520 accesses a data storage 514, which stores device data such as the position coordinates, sensor data, and/or processed data from the bike GPS devices 120. The device data comes to and/or from the tracking devices 508, in the form of log data, the tenant applications 510, which can be started or stopped, and the mobile applications 512, which can be started or stopped. Data, including data streams, has flow balanced by a load balancer 518, and comes in through a server 516, such as a wireless machine-to-machine server configured to support wireless coupling to the bike GPS devices 120 using a machine-to-machine protocol for data. Users of the system could include a superuser 502, a system user 524, a mission user 504, and an individual system user 506, or multiples of any of these. The data storage 514 could also store registration information, and generated reports, maps and diagnostics.

In the system shown in FIG. 5, the tracking devices are instances of the bike GPS device 120. Each bike GPS device 120 has a unique ID (identifier) and SIM card ID, which could be pre-provisioned from the factory in accordance with some embodiments. Once registered with the web application, e.g., at the mission control website 520, the bike GPS device 120 can be activated. Once activated, the bike GPS device 120 can send continuous trip information that is stored in the cloud, e.g., in the data storage 514. A user can enable and disable tamper sensors in the bike GPS device 120, and other sensors, features and functions. Data is stored in the data storage 514 along with user details. This data is available for the mission control website 520 to show various reports, maps and diagnostics. The server 516 acts as a communication server, and communicates with tracking devices, e.g., the bike GPS device 120, tenant applications 510, e.g., as operating on user devices 118, and mobile applications 512, e.g., as operating on cell phones 176. The load balancer 518 performs load-balancing of incoming requests. The mission control website 520 presents data for different users as per their privileges. The website performs additional functionalities, including device registration, in which a process builds a lookup table with the device-unique ID and SIM card ID, device activation, creation and management of missions, and creation and management of individual systems. Tracking is then associated with respective registration information, by the server 516. For example, tracking information and registration information could be stored in a database in the data storage 514 coupled to the server 516. Missions could be provided for tenants that own a large number of bike GPS devices 120, e.g., a fleet manager. Reports and diagnostics of devices belonging to that particular tenant are provided. Individual systems provide information that is derived from mission data and valuable to an individual. Tenant applications could perform user management and validation, and contact the server 516 to start and stop tracking of a device. The mission control website 520 could be accessed through the Internet, using a browser. In some embodiments, no client-side download components are required.

As an example of trip tracking, a trip could be started when an application programming interface (API) is called from a tenant application. The server 516 could call up the bike GPS device 120 to start the trip. The bike GPS device 120 would then wake up and establish a connection to the server 516. Once the connection is ready, the bike GPS device 120 would then send trip data to the server 516, either continuously or at intervals. The data is then stored in the data storage 514, for example in a database. The trip could be stopped when the user docks the bicycle back to a tenant station, or when the tenant application issues a direction to stop, to the API. A lost connection could be restored, with the bike GPS device 120 sending copies of any data that was not previously received at the mission control website 520. Various forms of error handling could be implemented.

Figure 6:
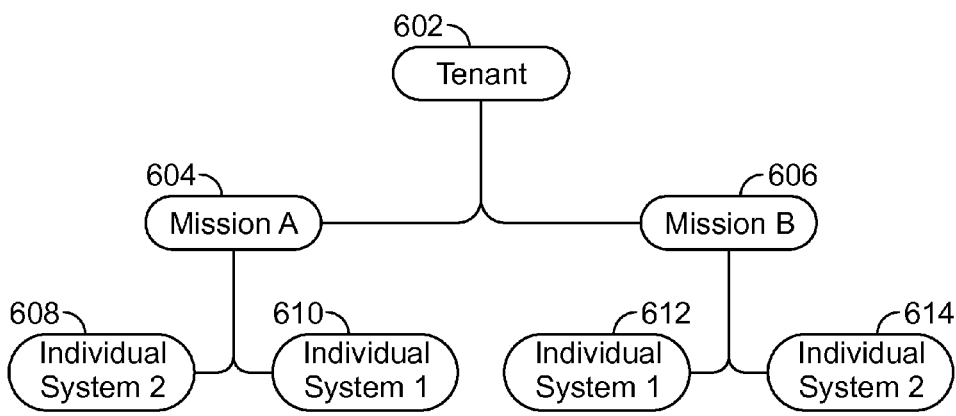
FIG. 6 is an hierarchical diagram showing organization of a tenant, missions, and individual systems, applicable to embodiments of the bike GPS device in accordance with some embodiments.

FIG. 6 is a hierarchical diagram showing organization of a tenant 602, missions 604, 606, and individual systems 608, 610, 612, 614, applicable to embodiments of the bike GPS device 120. The tenant 602 could establish one or more missions 604, 606. Each mission 604 oversees corresponding individual systems 608, 610.

Figure 7:
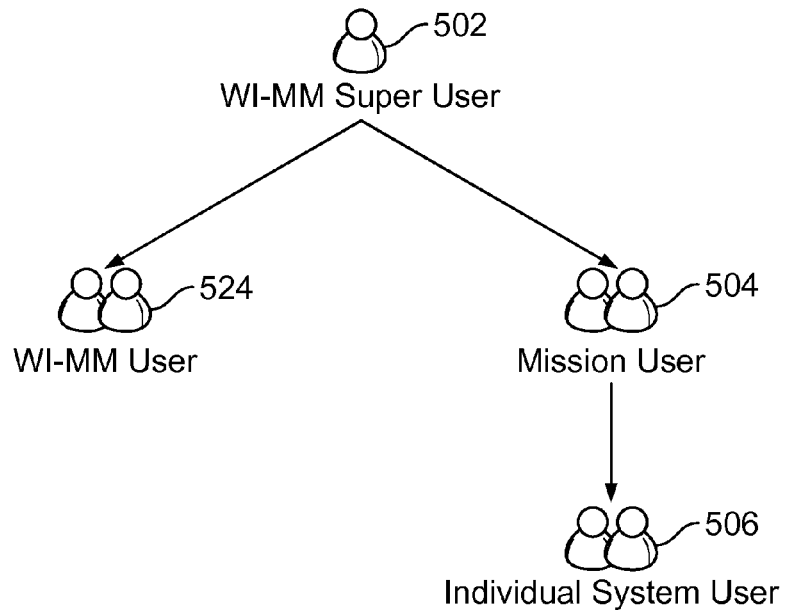
FIG. 7 is an hierarchical diagram showing organization of users of the bike GPS device in accordance with some embodiments.

FIG. 7 is a hierarchical diagram showing organization of users of the bike GPS device. The superuser 502 has higher priority and/or access privileges than the user 524 or the mission users 504. In turn, the mission users 504 have higher priority and/or access privileges than the individual system users 506. The hierarchies shown in FIGS. 6 and 7 are suitable for use in fleet management, group rides, bicycle races and other situations and organizations involving multiple bicycles and a corresponding number of bike GPS devices 120. For example, a mission user 504, accessing the mission control website 520, could view on a user interface 304 (as in FIG. 3) one or more summary reports showing mission name, company name, number of devices, number of devices on a ride, number of docked devices, etc. The mission user 504 could also view a map showing active devices, moving devices, docked devices, battery level, and individual device movement in real time. Clicking on one of the devices would then show the device ID, the bicycle number, the GPS or SIM card ID, the battery or "fuel" gauge, the speed if moving, the temperature of the unit, the time, and any errors such as if the device cannot be found or tracked.

In case of theft, an alarm notification could be sent to one or more of the mobile applications 512, one or more of the tenant applications 510, one or more of the individual system users 506, one or more of the mission users 504, one or more of the users 524, or one or more super users 502. The mission control website 520 could host images of bicycles or bicycles and users (owners/riders), as part of the registration process for bike GPS devices 120. For example, an alarm notification such as a text message could be sent to the cell phone 176 corresponding to a registered one of the bike GPS devices 120. An alarm notification and an image of the bicycle that was stolen could be sent to cell phones corresponding to bike GPS devices 120 of other riders whose position coordinates show them to be in the vicinity of the stolen bicycle. Any of such riders spotting the stolen bicycle would then contact the police. Email messages, with or without attached images, could be sent out to the owner and/or broadcast to other participants or registered owners. Or, position coordinates of a stolen bicycle could be sent to the police along with a photo of the bicycle and a request for recovery of the bicycle. A user could access current location and path information via any Internet connection, to locate a stolen bicycle.

Various applications can make use of position coordinates and other information sent to a network by one or more of the bike GPS devices 102. Applications could execute on a server, such as the cloud server 114 or the server 516, or could execute on a cell phone 176 or a user device 118. For example, an application could track riding habits, usage patterns, or bike performance. An application could track or manage aspects of a fleet of bicycles, such as a fleet of rental bicycles or a campus fleet for borrowing. An application could track or manage aspects of ridesharing, in which individuals lend out their bicycles and expect to get them back. An application could provide an alarm service, contacting a bicycle owner through one of multiple telephone numbers or email addresses and so on in the event of a theft or theft attempt. An application could provide a registration service, for registering the bike GPS device 102. This or another application could also provide a theft recovery service, either for current and active members, or upon request (or payment of a fee accompanied by a request). A request-based service could reactivate an otherwise inactive bike GPS device 102, which would then respond with a current location coordinate, effectively answering the question of, "Where is my bike?" A bike GPS device 102 could be configured to feed information, such as GPS information and power information, to a specified application, such as STRAVA™.

A registration application, executing on a server, could receive registration information such as name and contact information for the bicycle owner, an identifier of the unit, an image of the bicycle, an image of the user/owner/rider, and so on. Upon receipt of such information, the server could then activate the membership, and provide a user interface upon which the user can view tracking information. Once a registration is activated, the server can create and manage missions, and create and manage individual systems, i.e., a registered user can, with the use of the server, initiate a mission or an individual system, which is then tracked on the server for viewing by the user.

A business method or model is applicable to embodiments of the bike GPS device 120. A business could buy large blocks of wireless machine-to-machine protocol communication from a cellular telephonic network provider, and sell subscriptions to customers of the bike GPS device 120. The cellular provider would also provide a pool of reusable ID numbers, which could be assigned to customers of the bike GPS device 120 and reused upon cancellation of an account. The business could then charge subscription fees, which could be recurring, e.g., on an annual basis, and could charge for hardware sales. Inactive accounts could be reactivated, by charging a wake-up fee in some embodiments. Users of the bike GPS 120 could be offered a reduced price in exchange for receiving advertising. This business method or model could be applicable to bike fleets, to individual owners, or to bike sharing.

Figure 8:
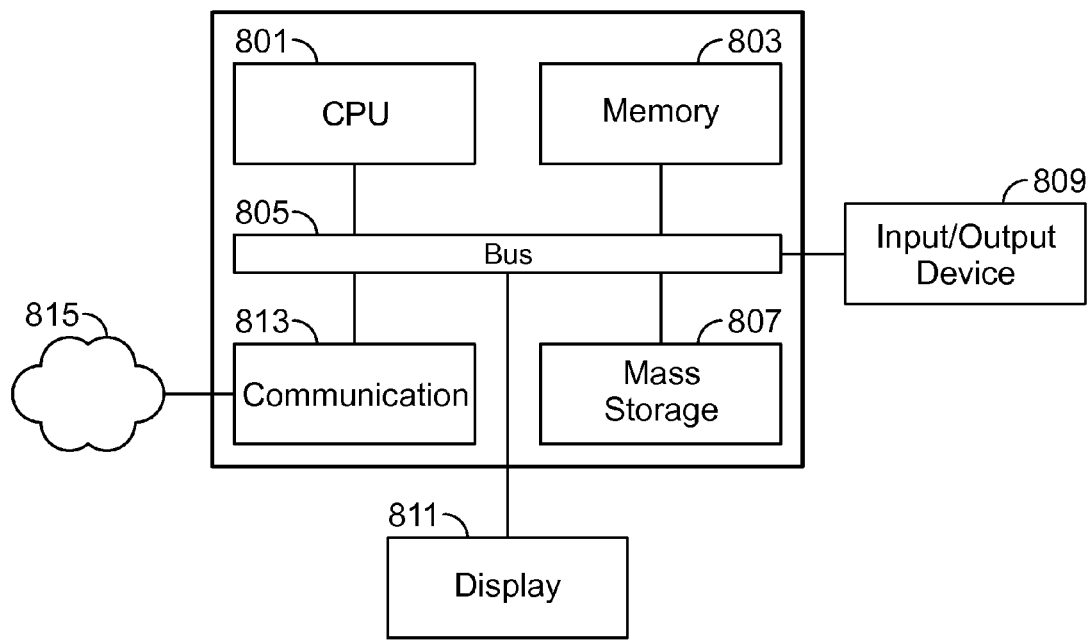
FIG. 8 is an illustration showing a computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 8 is an illustration showing an exemplary computing device which may implement the embodiments described herein. The computing device of FIG. 8 may be used to perform embodiments of the functionality for servers or user devices in accordance with some embodiments. The computing device includes a central processing unit (CPU) 801, which is coupled through a bus 805 to a memory 803, and mass storage device 807. Some computing devices have a communication port 813, coupled to the bus 805. The communication port 813 can be coupled to a network 815. Mass storage device 807 represents a persistent data storage device such as a floppy disc drive or a fixed disc drive, which may be local or remote in some embodiments. The mass storage device 807 could implement a backup storage, in some embodiments. Memory 803 may include read only memory, random access memory, etc. Applications resident on the computing device may be stored on or accessed via a computer readable medium such as memory 803 or mass storage device 807 in some embodiments. Applications may also be in the form of modulated electronic signals modulated accessed via a network modem or other network interface of the computing device. It should be appreciated that CPU 801 may be embodied in a general-purpose processor, a special purpose processor, or a specially programmed logic device in some embodiments.

Display 811 is in communication with CPU 801, memory 803, and mass storage device 807, through bus 805. Display 811 is configured to display any visualization tools or reports associated with the system described herein. Input/output device 809 is coupled to bus 805 in order to communicate information in command selections to CPU 801. It should be appreciated that data to and from external devices may be communicated through the input/output device 809. CPU 801 can be defined to execute the functionality described herein to enable the functionality described with reference to FIGS. 1A-7. The code embodying this functionality may be stored within memory 803 or mass storage device 807 for execution by a processor such as CPU 801 in some embodiments. The operating system on the computing device may be MS DOS™, MS-WINDOWS™, OS/2™, UNIX™, LINUX™, or other known operating systems. It should be appreciated that the embodiments described herein may be integrated with virtualized computing system also.

Figure 9:
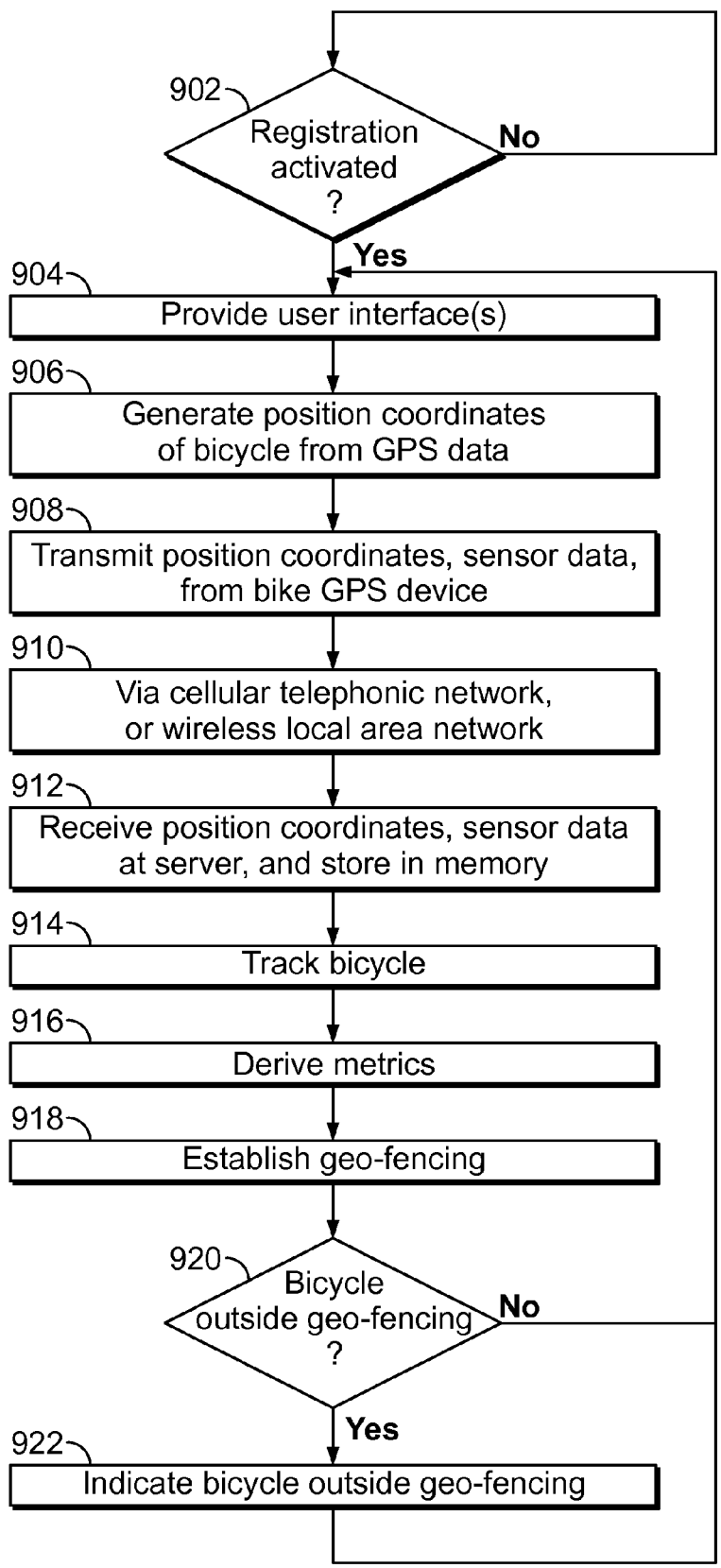
FIG. 9 is a flow diagram showing a method of monitoring a bicycle, which can be practiced using embodiments of the bike GPS device.

FIG. 9 is a flow diagram showing a method of monitoring a bicycle, which can be practiced using embodiments of the bike GPS device 120. The method can also be practiced by a processor, using embodiments of the server 114 (in FIG. 1A) or the server 516 (in FIG. 5).

In a decision action 902, the question is asked, is the registration activated? If the answer is no, flow loops at the decision action 902, until the registration is activated. As an alternative, the flow could branch elsewhere, for example to check on other registrations or perform additional processes. If the answer is yes, flow continues to the action 904.

Once the registration is activated, a user interface is provided, in an action 904. This user interface could be provided by a server which maintains the registrations and corresponding tracking of position coordinates and sensor data. Other aspects that could be activated responsive to receiving registration information and activating the registration, include management of a mission, and management of an individual system.

Position coordinates of the bicycle are generated from GPS data, in an action 906. This takes place in a bike GPS device.

The position coordinates and sensor data are transmitted from the bike GPS device, in an action 908. This could occur on a periodic basis, or upon detection of motion, etc. Some versions may lack sensors and would not transmit sensor data. The transmission is via a cellular telephonic network, or a wireless local area network, in the action 910. Which of these is applicable could depend upon available hardware in the bike GPS device, or the bike GPS could arbitrate if more than one path is available and hardware supports this.

The position coordinates and sensor data are received at the server, and stored in memory, in the action 912. This would generally be memory coupled to the server, and could include RAM (random access memory), hard drives, solid-state memory, and so on.

The bicycle is tracked, in an action 914. This could include tracking the current location, tracking a path on which the bicycle has traveled, tracking relative to geo-fencing, tracking on a map, tracking relative to a fixed location, tracking relative to a variable location, tracking relative to an agreement, a plan or a policy, as in ridesharing, group rides or fleet management, and so on. Metrics are derived, in an action 916. This could include calculations involving distance, time and/or sensor data as discussed above.

Geo-fencing is established, in an action 918. This could be accomplished by establishing a central location of a geo-fencing zone and calculating coordinates of a perimeter based on the central location, or comparing newly arriving position coordinates to the central location, with various geometries as zones. Circular or rectangular regions are likely the simplest shapes for geo-fencing zones, but other shapes for zones and calculations pertaining thereto are readily devised.

In a decision action 920, the question is asked, is the bicycle outside the geo-fencing? A determination can be made by comparing a current location of the bicycle to one or more coordinates of the geo-fencing zone. If the answer is no, the flow branches back to the action 904, to provide or update the user interface(s). If the answer is yes, the flow branches to the action 922, to indicate that the bicycle is outside the geo-fencing. This could include activating an alarm, sending a notification or a broadcast message, and/or indicating on the user interface. After so indicating, the flow branches back to the action 904, to provide or update the user interface(s). Geo-fencing could be activated or deactivated, and the corresponding steps followed or bypassed as appropriate. Geo-fencing could be activated as part of a theft prevention or other routine. Geo-fencing could be relative to a fixed location, as in theft prevention, fleet management, ridesharing or a group ride, or relative to a moving location as in electronic tethering a first bicycle, equipped with a bike GPS device, to a second bicycle equipped with a bike GPS device.

Figure 10:
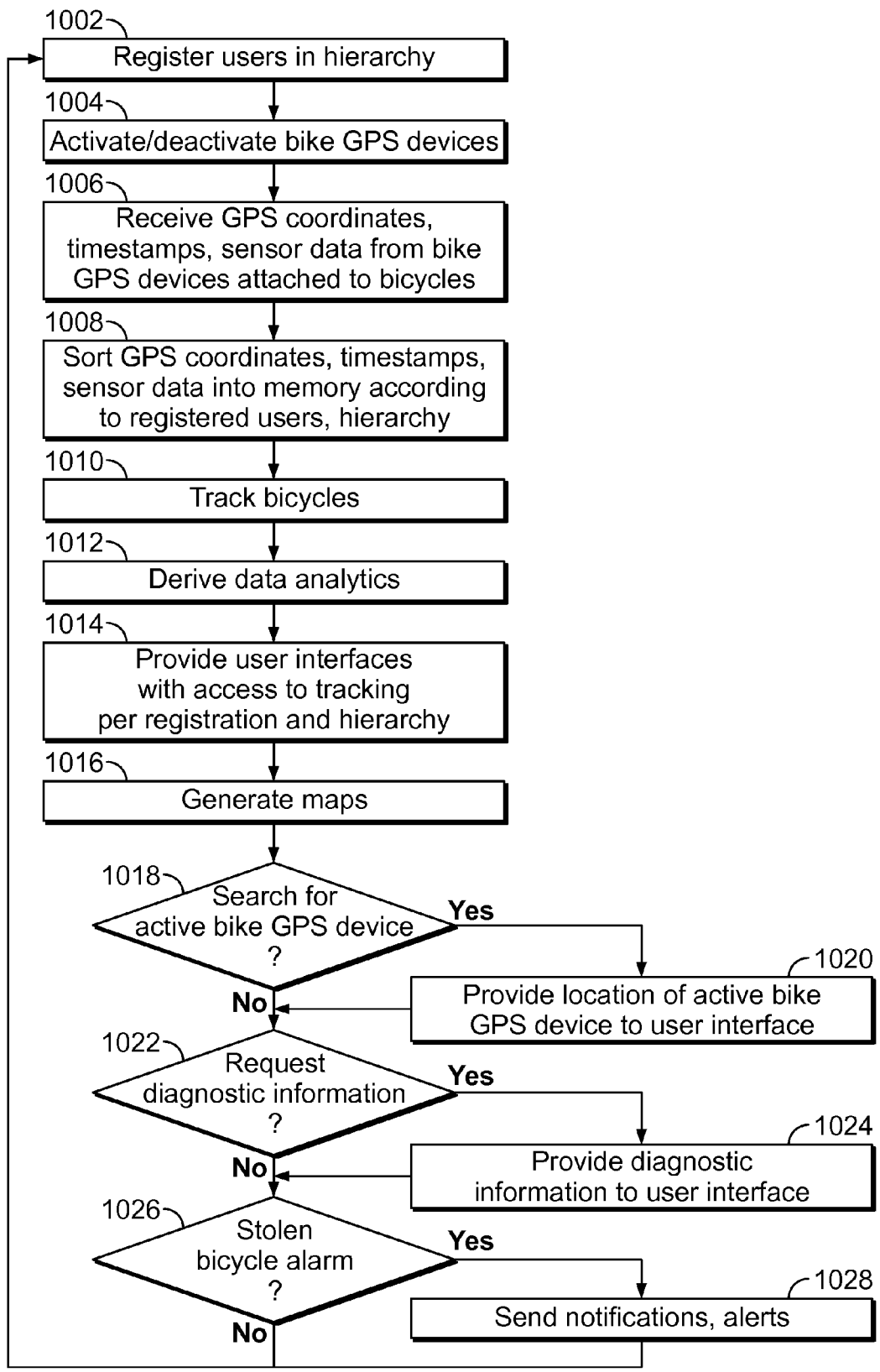
FIG. 10 is a flow diagram showing a method for tracking bicycles, which can be practiced using embodiments of the bike GPS device.

FIG. 10 is a flow diagram showing a method for tracking bicycles, which can be practiced using embodiments of the bike GPS device. The method is suitable for use in bicycle fleet management, bicycle ridesharing programs, group bicycle rides, and management of a plurality of bike GPS devices, among other uses. A computing device, such as a server coupled to a network, can execute software programmed according to the method. Examples of implementations of the actions of the method are given below, and are further available as described above with reference to FIGS. 1-8.

Users are registered in a hierarchy, in an action 1002. For example, a registry could be established and maintained on a server, and users of the bike GPS devices could register by providing various pieces of information. Passwords or other forms of authentication could be established and applied. The users, and the hierarchy, could include super users, to whom information regarding missions, tenants, the plurality of bike GPS devices, and the position coordinates from each of the plurality of bike GPS devices, is provided by the server. The users, and the hierarchy, could include global users, to whom information regarding missions of a fleet of bicycles and the bike GPS devices corresponding thereto is provided by the server. The users, and the hierarchy, could include mission users, to whom information regarding a mission of the mission user and the bike GPS device corresponding thereto is provided by the server. The users, and the hierarchy, could include individual system users, to whom information regarding an individual system of the individual system user and the bike GPS device corresponding thereto is provided by the server.

Bike GPS devices are activated or deactivated, in an action 1004. This could be in accordance with the registrations, i.e., when a new registration is made, the corresponding bike GPS device is activated, and when a registration expires, a corresponding bike GPS device is deactivated. GPS coordinates, timestamps, and/or sensor data are received from the bike GPS devices attached to the bicycles, in an action 1006. As described above, these various types of data are transmitted from each bike GPS device via a wireless coupling to a network, and are transferred from the network to the server, or from the network to another network and thence to the server, etc. The GPS coordinates, timestamps and/or sensor data are sorted into memory according to the registered users and the hierarchy, in an action 1008. For example, these could be sorted by the server into a memory coupled to the server. Data could be sorted as it arrives, or later in batches, or a combination of the two.

The bicycles are tracked, in an action 1010. Tracking could include keeping track of current locations of bicycles, and/or tracking paths the bicycles make, i.e., keeping track of a series of position coordinates of each of the bicycles, with or without timestamps. Tracking could include keeping track of sensor data as a function of position coordinates and/or time. Tracking of a trip could be started upon a request, e.g., via the server, or could be started in response to a GPS bike device establishing a coupling to the server. This could happen in response to an auto wakeup function of the bike GPS device, based on motion detection or geo-fencing. The tracking of the trip could be stopped in response to a request to stop the trip tracking. If the coupling from the bike GPS device to the server is lost, the bike GPS device could store data, and send the data to the server upon resumption of the coupling to the server.

Data analytics are derived, in an action 1012. As discussed above, many types of data analytics are possible, and these can be derived from the position coordinates, timestamps and/or sensor data. For example, data analytics could relate to personal fitness, bicycle traffic patterns, bicycle rider habits, bicycle travel patterns, bicycle riding retail stops, wireless network signal parameters as a function of the position coordinates, and/or environmental conditions as a function of the position coordinates. Data analytics could be bundled for access by, or sale to various individuals or groups, for various purposes such as self-use, corporate use, government use, academic use, or studies. For example, data analytics could be prepared for a social fitness aggregation platform, traffic pattern analysis, municipal planning, location-based sales analytics, bicycle and accessories sales analytics, environmental analytics, cellular telephonic network analytics, and/or wireless local area network analytics.

User interfaces are provided, with access to tracking per the registrations and the hierarchy, in an action 1014. For example, a fleet owner or operator, a mission operator, an individual contracting for use of a bicycle from a fleet, and an individual owning a bicycle and a bike GPS device, could each have a specialized user interface and/or access to an appropriate portion of the data on the server, i.e., access and/or information is restricted according to the hierarchy. A mission control website could be provided to group operations, such as fleet management or ridesharing, from which to control registration of bike GPS devices, activation of bike GPS devices, management of missions, and management of individual systems.

Maps are generated, in an action 1016. Maps could include a fleet map that shows locations of bicycles of a fleet, mission maps that show paths of bicycles on missions, and individual maps that each show one or more paths taken by a bicycle of an individual. The maps are based on the position coordinates. Maps could show additional information, such as information based on the data analytics.

In a decision action 1018, a question is asked, should there be a search for an active bike GPS device? For example, an owner could be requesting to locate a bicycle that has been misplaced or stolen. As a further example, an operator could be searching for an active bike GPS device, in order to deactivate the bike GPS device, e.g., in a case of a lapsed registration or lack of payment of connection fees.

If the answer is yes, there should be a search for an active bike GPS device, the location of the active bike GPS device is provided to a user interface, in an action 1020. Other actions could take place here, such as deactivating the bike GPS device, enabling or disabling selected features, and so on. If the answer is no, the flow branches to the decision action 1022.

In the decision action 1022, a question is asked, is there a request for diagnostic information? For example, the request could be for diagnostic information stored in a memory coupled to a server, e.g., as relating to past rides over a range of dates, or paths of the bicycle, previous ownership of the bicycle, status of a registration, and so on. If the answer is yes, the diagnostic information is provided to a user interface, in an action 1024. If the answer is no, the flow branches to the decision action 1026.

In the decision action 1026, a question is asked, is there a stolen bicycle alarm? For example, a current location of the bicycle, determined from the position coordinates received at the server, could be outside of a geo-fencing established as part of a theft prevention system, and this determination could act as an alarm. As a further example, motion detection of the bicycle could be reported from the bike GPS device, during a time in which the owner or operator of the bike GPS device has activated theft prevention, e.g., by a wireless key fob communicating with the bike GPS device, or remotely from the server communicating back to the bike GPS device, etc. The alarm could be silent, or could be accompanied by an alarm sound emanating from a buzzer attached to an alarm unit of the bike GPS device.

If the answer is yes, there is a stolen bicycle alarm, notifications and/or alerts are sent, in an action 1028. These could include notification to a user via email, notification to a user via a text message, notification to a crowd-sourced platform, notification to social media, an alert showing a bicycle location on a map, an alert showing a real-time location of the bicycle, an alert to registered users of the plurality of bike GPS devices, an alert to a partner database, an alert to a police database, an alert to a community association, an alert to a neighborhood association, and/or an alert localized to a geographic area. This could be part of a stolen bicycle recovery system. After the action 1028, or if the answer is no, there is no stolen bicycle alarm, flow branches back to the action 1002, in order to register any new users in the hierarchy. Flow could branch elsewhere, in further embodiments, e.g. to perform additional actions, or to repeat or bypass actions, etc.

Figure 11:
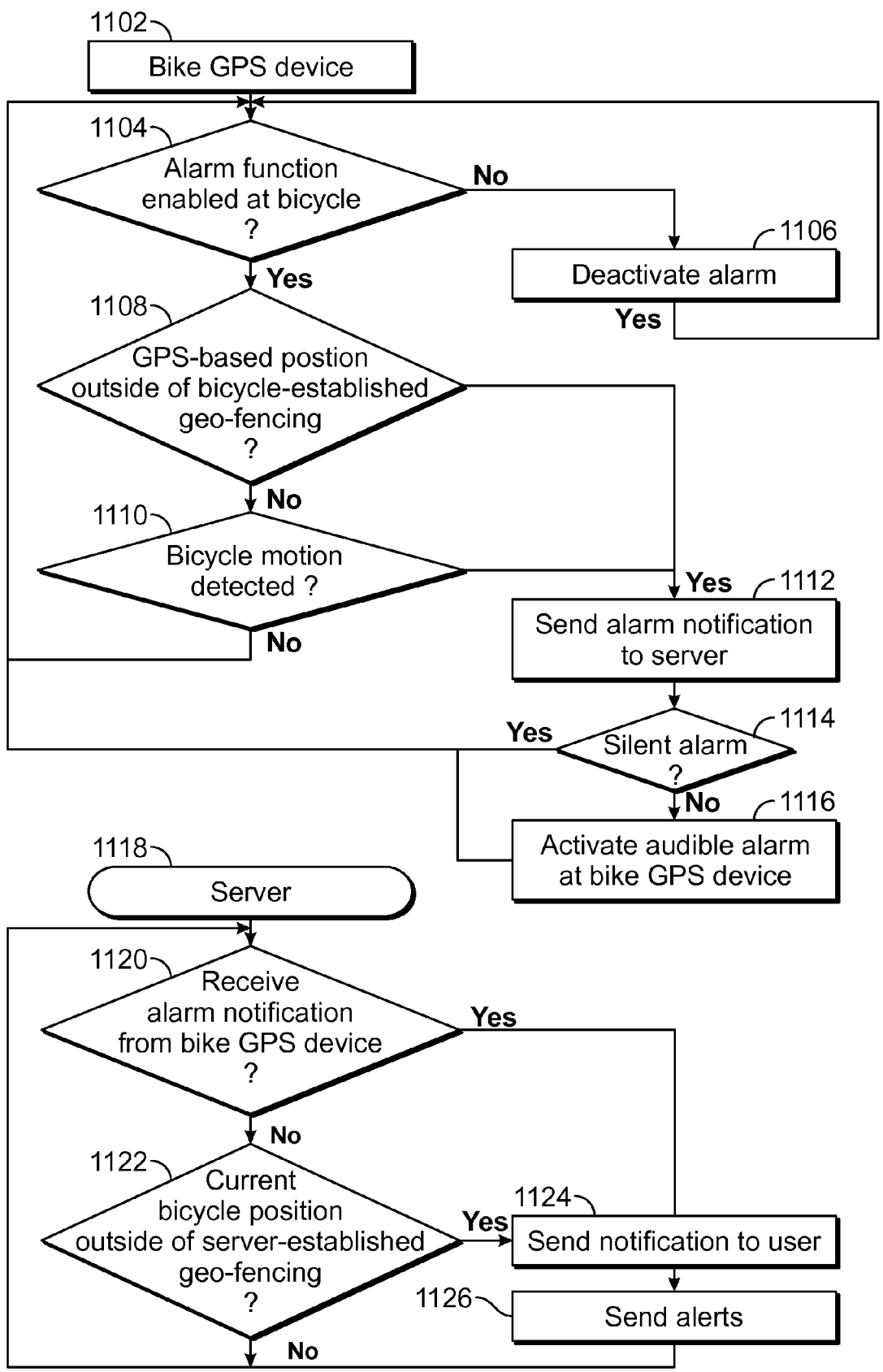
FIG. 11 is a flow diagram showing a method for bicycle theft prevention and recovery, which can be practiced using embodiments of the bike GPS device.

FIG. 11 is a flow diagram showing a method for bicycle theft prevention and recovery, which can be practiced using embodiments of the bike GPS device. The method is suitable for use in individual bicycle ownership, and also in bicycle fleet management, bicycle ridesharing programs, group bicycle rides and management of a plurality of bike GPS devices, among other uses. A computing device, such as a server coupled to a network, can execute software programmed according to the method. Examples of implementations of the actions of the method are given below, and are available above with reference to FIGS. 1-8.

The upper half of the flow diagram of FIG. 11 operates at the bike GPS device, as shown in the bike GPS device entry point 1102. After the entry point 1102, in a decision action 1104, a question is asked, is the alarm function enabled at the bicycle? For example, a user could activate an alarm function of the bike GPS device by pressing an appropriate button on a wireless communication device, e.g., a wireless key fob. If the answer is no, then the alarm is deactivated in an action 1106. The alarm may already be deactivated, in which case the action need not be repeated. Alternatively, the audible alarm may have been activated, in which case the deactivation turns off the audible alarm. If the answer is yes, the alarm function is enabled, flow branches to the decision action 1108.

In the decision action 1108, a question is asked, is the GPS-based position of the bicycle outside of a bicycle-established geo-fencing? For example, the bike GPS device could be monitoring the current position coordinates of the bike GPS device and bicycle to which the bike GPS device is attached, and comparing the current location of the bicycle to position coordinates, stored in the bike GPS device, that indicate a geo-fencing. This geo-fencing could have the shape of a circular or rectangular geo-fencing zone or boundary, or some other geometric shape. If the answer is yes, the flow branches to the action 1112. If the answer is no, the flow branches to the decision action 1110.

In the decision action 1110, a question is asked, is bicycle motion detected? For example, a motion detection sensor of the bike GPS device could detect that the bicycle is jostled, moved in a direction, or tilted at an angle that differs from the angle at which the bicycle was oriented when the alarm function was enabled at the bicycle. If the answer is yes, the flow branches to the action 1112. If the answer is no, the flow branches back to the decision action 1104, in order to continue monitoring for a possible theft situation.

In the action 1112, an alarm notification is sent to the server. This is because a possible theft situation has been detected by the bike GPS device, e.g., through either geo-fencing or motion detection. The alarm notification is sent from the bike GPS device via a cellular telephonic network or via a wireless local area network, as described in various embodiments.

In a decision action 1114, a question is asked, is this a silent alarm? If the answer is yes, the flow branches back to the decision action 1104, to determine whether the alarm function is still enabled. If the answer is no, the alarm is not silent, an audible alarm is activated at the bike GPS device, in an action 1116. Flow then branches back to the decision action 1104, to determine whether the alarm function is still enabled.

The lower half of the flow diagram of FIG. 11 operates at the server, as shown at the entry point 1118. In a decision action 1120, a question is asked, is an alarm notification being received, at the server, from the bike GPS device? If the answer is yes, flow branches to the action 1124. If the answer is no, flow branches to the decision action 1122.

In the decision action 1122, a question is asked, is the current bicycle position outside of a server-established geo-fencing? For example, the server could compare a current position of the bicycle, based on recently received position coordinates from the bike GPS device, with position coordinates stored at the server that establish geo-fencing. The position coordinates stored at the server could establish a circular, rectangular or other shaped geo-fencing zone or perimeter, based on previously received position coordinates from the bike GPS device. If the answer is yes, the flow branches to the action 1124. If the answer is no, the flow branches back to the decision action 1120, in order to continue monitoring for an alarm notification or a violation of server-established geo-fencing.

In the action 1124, a notification is sent to the user. The notification could include a location of the bicycle, and could be sent as a text message to a cellular telephone, or an email. The notification could be sent to a crowd-sourced platform, or to a social media, of which the user is a member. More than one notification could be sent.

In the action 1126, alerts are sent. The alerts could include an alert showing a bicycle location on a map, an alert showing a real-time location of the bicycle, an alert to registered users of the plurality of bike GPS devices, an alert to a partner database, an alert to a police database, an alert to a community association, an alert to a neighborhood association, and/or an alert localized to a geographic area. The localized geographic area could be based on position coordinates recently received at the server. After the action 1126, flow branches back to the decision action 1120, in order to continue monitoring for an alarm notification or a violation of server-established geo-fencing.

It should be appreciated that some embodiments implement one, both, or neither of bicycle-established geo-fencing and server-established geo-fencing, with appropriate modifications to the above-described method. For example, a user who has not paid a current registration fee or who opts out of coupling to a server could rely on using motion detection at the bicycle and bicycle-established geo-fencing, and the audible alarm, but forgo communication to the server, and thereby forgo server-established geo-fencing. A base model of the bike GPS device could use motion detection at the bicycle but not implement geo-fencing. A deluxe system could provide the extra security of both bicycle-established geo-fencing and server-established geo-fencing, to thwart a thief who manages to defeat the bicycle-established geo-fencing, e.g., by acquiring a wireless key fob that can deactivate the alarm function at the bicycle.

With reference back to FIGS. 1-11, various aspects, features, applications and systems relating to the bike GPS device 120 are discussed below. It should be appreciated that various embodiments can be formed from various combinations, and that an embodiment can have a subset, a variation of, or all of the features herein described.

The bike GPS device 120 has real-time wireless connectivity to the cloud. The bike GPS device 120 includes a cellular modem which connects the mobile device to the network. Some designs support global deployments with GSM and CDMA versions, or Wi-Fi versions which could be applicable in campus bike sharing systems. This real-time wireless connectivity is a contributor to the theft deterrent and recovery aspects of the bike GPS device 120. Bike sharing operators have immediate knowledge about their fleets, and individual bike owners don't have to wait until the end of a ride to upload data. Data is collected and archived in real-time. Since the coupling to the server is wireless, there is no need for cables or removing the bike GPS device 120 from the bicycle.

The bike GPS device 120 combines three functions: integrated theft deterrence, GPS, and a performance analytics engine. A security system, featuring the bike GPS device 120 and a specially programmed server 114, 516, has extensive user notification and crowd-sourced broadcasting. If a bicycle is stolen, the security system automatically notifies the user through emails and texts. Notifications can also extend to crowd-sourced platforms and social media to aid recovery—akin to an Amber Alert. Alerts include information about the bicycle, along with a map. Notifications can provide real-time information about the bicycle location. Alerts can be broadcast to other registered users/owners of the bike GPS device 120, national bicycle registry registrants, partner company databases (e.g., Strava or other bike analytics application for large numbers of users), and through other APIs to external databases such as local police departments and community and neighborhood associations. Notifications can be posted to user selected "opt-in" individual social media accounts such as Twitter or Facebook, or to corporate profiles localized to specific geographic areas.

An array of sensors 130, including a gyro sensor, and various algorithms in the bike GPS device 120 can be used to discern a general environment for a bicycle. One feature of the bike GPS device 120 is automated wake-up based on motion detection. This promotes battery savings and ease-of-use. When a rider hops on the bicycle, the bike GPS device 120 detects this, and the unit can function without the need for a rider carrying a cell phone or other external stimulus device. The bike GPS device 120 detects the difference between movement scenarios, such as when a bicycle owner places a bicycle on a car carrier or any motorized vehicle, or moves the bicycle in an elevator. The gyro sensor and other sensors, and intelligent algorithms, are used for environment identification.

The bike GPS device 120 can mount at the water bottle site on a bicycle frame, since most bicycles have threaded inserts for a water bottle cage, and spacing and thread size is standardized. This mounting location is a factor for assuring optimal performance of the wireless electronics. This mounting location also provides a level of stealth since the bike GPS device 120 is sandwiched between the frame and the water bottle, with an appearance similar to a frame mounted bicycle pump.

One method to arm and disarm an alarm function of the bike GPS device 120 is to use a wireless key fob, similar to an automotive key fob. This key fob can be based on Bluetooth, and can be configured for automatic proximity triggering so that the bike GPS device 120 mounted on the bicycle automatically recognizes when the key fob, and therefore the bicycle owner, approaches the bicycle. The key fob can also be an accessory that clips to the bicycle when the rider is using the bicycle. A multi-key fob can be used for basic commands such as to start and stop tracking and logging, to set or disarm the alarm, and to set the unit into a "deep sleep" mode for battery conservation when the bicycle is in a safe location, all without the need for a cell phone with an application.

Bike sharing and fleet management are supported by the bike GPS device 120. One system with a server and software capability is targeted towards bike sharing and fleet management operators. A wide-area mesh network can be based on geographically distributed bicycles equipped with the bike GPS device 120 system. The audible alarm feature of the bike GPS device 120 can be programmed with a unique tone pattern which could, with wide enough product acceptance, become an instantly recognized indicator related to bike theft. This would be analogous to the particular whooping sound associated with car alarms.

The bike GPS device 120 has a form factor and electronics layout optimized for bicycles. The physical layout, form factor, and mount location are optimized specifically for bicycle use. The antennas 132, 134 are placed above and below the water bottle to avoid signal blockage from the water in the water bottle 208. The bicycle-mounted unit is designed with a long and narrow form factor with physically separated wireless functional blocks. The GPS receiver maintains high sensitivity in the presence of simultaneously operating relatively high power co-located transmitters due to circuit partitioning and the printed circuit board (PCB) layout. The bike GPS device 120 form factor is also optimized for insertion inside a bicycle frame 204. Global wireless compatibility is supported by a board design with load options for multiple cellular wireless standards.

Moving electronics inside the bicycle frame 204 is a differentiator for the bike GPS device 120. Electronics inside the frame becomes a permanent part of the bicycle, making the unit available to the user without fear of theft or the requirement for attachment and detachment each time the bicycle is used. Moving the alarm system inside the frame 204 hides electronics and minimizes visibility and potential for tampering.

The bicycle-mounted bike GPS device 120 can be recharged locally with power derived from a dynamo hub generator 150. The bike GPS device 120 manages the charging function, and can serve as a master control system for other bike mounted sensors and lighting as part of a bike integrated power system. Core functions for alarm, location mapping and logging, and fitness performance analytics are further enhanced and differentiated by integrating an environmentally friendly, tetherless power system. A further embodiment could use energy harvesting piezoelectric transducers or regenerative braking as part of a system to convert mechanical energy to electrical energy for battery charging as the rider pedals.

A bicycle frame made from a low dielectric constant, or windows with same, supports embedded wireless applications. Wireless signals cannot propagate through metal or carbon fiber, two materials traditionally used for bicycle frames. By integrating low dielectric constant, non-conductive windows into the frame at strategic locations, an assembly is created that permits electromagnetic radiation to pass to and from the bike GPS device 120 inside the bicycle frame 204.

The bike GPS device 120 has a bike area network embedded processing engine with integrated wireless connectivity, sensor and power management, and system management software. The bike GPS device 100 can act as the hub or processing engine for on-board sensors, wireless connectivity, and power management, and can also manage other local bicycle or body-worn sensors, electronic shifting, and lighting. The bike area network can be enabled through Bluetooth, and can include sensors measuring heart rate, cycling power, cadence, speed, etc.

A bike frame integrated display can be featured. The electronics system embedded in the frame can be mounted inside the horizontal top tube and can incorporate a display seamlessly molded into the frame and facing up toward the rider. The display can be a dashboard for the bike GPS device 120, similar to the dashboard of an automobile. The display could make use of wider, more square horizontal tubes which are trend in one segment of the bicycle industry.

A cloud-based bike area network embedded processing engine, with integrated real-time wireless connectivity, sensor and power management, and system management software, is supported by the bike GPS device 120. The bike GPS device 120 further supports a stolen bike recovery system, based on the bike mounted cloud-based activity monitor and crowd-sourced broadcasting. The bike GPS device 120 further supports a cloud-based national bicycle registration software with automated registration, broadcasting, programmable geo-zones, bicycle owner and bicycle photos. The bike registration and stolen bike recovery system includes a cloud-based national registry for bicycle owners, featuring integration with the bike GPS device 120 system, electronic registration, and opt-in documentation of the bicycle owner with bicycle ID and bicycle photos. Functional features facilitated through software, server, and database include: programmable geo-zones, crowd-sourced stolen bike broadcasting and management of bike GPS device 120 functions.

Auto wake up for stolen bike recovery is included as a way to locate a bicycle even if the owner is not currently subscribing to a wireless plan for the bike GPS device 120. The location could be identified through periodic unilateral queries from the server. Additionally, units equipped with Wi-Fi can be queried should the bicycle pass through an area with public Wi-Fi service. Management of the frequency of queries as a function of battery capacity and other factors such as cell service signal levels or whether cellular networks or Wi-Fi networks would be used, is controlled through customized software.

Social fitness applications can be based on the bicycle-mounted cloud-based bicycle activity monitor. A mobile app (application) can be designed to mate with the cloud-based bicycle mounted activity monitor. This app could include automated notifications and statistics, coaching, and route optimization prediction.

A multiple tier bike fleet management system includes software and a hierarchical multi-tier architecture. Fleet management involves top level (factory/enterprise), mid-level (fleet operator) and low level (individual rider) database management and user interfaces. This combines previously noted capabilities and features into a fleet management system.

A social fitness aggregation platform is supported. A back-end server and software capability combined with a mobile app can serve as an aggregation platform for social fitness monitors. For example, a single software platform could integrate data analytics from the bike GPS device 120, with personal fitness monitors such as Fitbit, Up, and others, to effectively act as a super app for multiple social fitness monitoring devices.

Data analytics for traffic pattern analysis and municipal planning can be based on the bike-mounted monitor and cloud-enabled data collection system. A large amount of data can be gathered from bicycle riders, using the bike GPS device 120. A data analytics software suite could be offered specifically for municipalities interested in using the data for transportation planning. The combination of where the data originates, e.g., bicycles, how the data is collected, and its bundling for specific use of municipalities is a contribution from the bike GPS device 120.

Data analytics for bicycle and accessory sales can be based on user habits and patterns derived from a bicycle-mounted monitor and cloud-enabled data collection system. A data analytics software suite could be offered specifically for bicycle and bicycle accessory manufacturers interested in acquiring data about bicycle rider habits. This could offer a way for vendors to maintain a long-term relationship with customers, who can be alerted to sales or other targeted marketing opportunities.

Data analytics for environmental data can be based on a network ID and signal parameters from bicycle-mounted monitors and the cloud-enabled data collection system. A data analytics software suite can be offered that leverages data originating from bicycles and is for sale to external customers. One data analytic category includes data about wireless network signal parameters as a bicycle moves through the environment. One data analytic category includes data about environmental conditions based on bike-mounted pollution sensors. Further software analysis could examine health trade-offs of fitness versus pollution, and riding routes.

Data analytics for calculation and sale of carbon offsets could be offered, with a software suite specifically for calculation of carbon dioxide footprint and offset. Bicycle sharing and fleet operators can use the data for financial compensation in the greenhouse gas carbon emissions offset market.

An embedded processing engine for optimal battery management and network arbitration and optimal selection are offered by the bike GPS device 120. Embedded software in the bike GPS device 120 optimizes which network to use, e.g., cellular, Bluetooth as through a cellular phone, or Wi-Fi, for optimal system availability, optimal battery management, and lowest latency.

Trip tracking, from the tenant application, could be started when a start API is called from the tenant application. The server would then call up the bike GPS device 120, to start the trip. The bike GPS device 120 then wakes up and establishes a connection to the server. Once the connection is ready, the bike GPS device 120 sends trip data to the server at intervals. The data is stored in a database. Once a user docks a bicycle back at the tenant station, the tenant calls a stop API. This sends a stop signal to the server. The server then closes the connection. During the trip, if the connection is lost, whether through loss of wireless coupling or loss of a network connection, the bike GPS device 120 stores data until a connection can be restored. Once the connection is restored, the bike GPS device 120 sends the data that was stored to the server. Error handling could include setting of an error bit in case of error, or could include error correction via use of an error correction code (ECC).

Messages from the bike GPS device 120 could have various formats. One format could be to send a unit ID as an alphanumeric, a timestamp from the GPS data, a latitude and longitude from the GPS data, a GPS fix status, a speed, an RSL (received signal level, e.g., of the wireless coupling), a pressure, e.g., atmospheric pressure as an absolute or normalized, and/or temperature.

A server communicates with tracking devices, e.g., the bike GPS device 120, and related client entities, e.g., tenant apps, mobile apps, for tracking and reporting. The server can activate a device, perform check-in and checkout, and get data pushed from the device. The server can apply an authentication mechanism to ensure data is from trusted clients. The server can be hosted in a physical environment, a virtual computing environment, or a cloud environment.

In the hierarchy of users, a superuser, including one type of superuser known as an administrator, can create missions. Each mission could have a mission ID, a mission name, a mission description, tenant details, a language package, units, mission users created during mission creation, and pages for the mission users. The superuser can have access to the entire data collected by devices subscribed globally. The superuser can view or edit missions, search the missions, and add or remove mission users.

An administrator can enter a unique ID for new devices, a SIM ID, and a phone number to create a lookup table for device activation. The administrator can also search for a device ID and review information in a table. The administrator can create superuser custom dashboards for analyzing worldwide data. A super administrator user can enable access of widgets for other mission users. Widgets could access, derive and display the total number of devices, active devices, pending activation devices, total miles, average miles, total time, average time, carbon footprint, calories burned, cost savings in terms of money, etc. The super administrator should be able to create and edit default report templates, add or change the name of the report, define a unit for the final report, add or remove fields, customize columns and positions, add or remove filters that are available for an end-user to generate reports, such as mission, company, device status, date and time, battery gauge, and user type, and add or remove other users.

A system user can create a custom dashboard, pinning available default summary reports and arranging them on the dashboard, or removing a summary report from the dashboard. The system user can access all default reports and reports for which the system user has privilege. The system user can customize reports, setting available filters, removing and rearranging columns and so on.

Maps can be generated with various color codings such as for a trip with no issues, a trip with a lost connection, a docked bicycle, and a device error, e.g. a battery critically low. Maps could start with a global view, so that a system user can see all missions available. Each mission could be represented as a colored dot, and hovering over one of the dots shows summary reports with mission name, company name, number of devices, number of devices on a ride, and number of docked devices. Clicking on a dot zooms into a mission, which shows a sidebar with filters for selections of what is shown in the map. The filters include active devices, all devices, moving devices, docked devices, battery level, and device errors. Maps show the fleet moving in real time. Maps show bubbles indicating moving and parked devices. Clicking on a bubble shows a pop-up with details such as device ID, bike number, GPS/SIM ID, battery/fuel gauge with indicator of percentage left, speed if moving, temperature of unit, time, and any errors such as error details or if the device cannot be found or tracked.

A mission user can create and manage individual systems. This includes adding an individual system name and description, or deleting an individual system. The mission user can create users for the individual system, adding username, email ID, and contact details for each user, and resetting a default password if needed. In a dashboard, the mission user can see a summary report of a parent mission. The mission user can access mission maps.

The individual system user can see, in a dashboard, data under his parent mission. The individual system user can view reports with data under his parent mission. It should be appreciated that various further categories of users in an hierarchy, and various arrangements of permissions, accesses, displays and capabilities for the users in the hierarchy are readily devised in variations of the above descriptions, per the teachings described in this specification.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including handheld devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A device, comprising:
   an electronic device configured to attach to a human-powered vehicle; and
   the electronic device further configured to perform actions, including:
   producing position coordinates based on global positioning system data;
   coupling to a network via a wireless connection;
   relaying the position coordinates to the network via the wireless connection; and
   tracking one from a group consisting of: riding habits, usage patterns, and bicycle performance.

2. The device of claim 1, further comprising:
   the electronic device configured to be powered by energy harvested from the human-powered vehicle.

3. The device of claim 1, wherein:
   a frame of the human-powered vehicle has a portion with radiowave transparency; and
   the electronic device is configured to install within the portion of the frame.

4. The device of claim 1, further comprising:
   at least one from a group consisting of: an altimeter, an air quality sensor, a gyro sensor, an accelerometer, a tamper sensor, and a signal strength sensor, wherein the electronic device is configured to process data from the at least one from the group and relay the processed data to the network via the wireless connection.

5. The bicycle electronic device of claim 1, wherein the network includes one from a group consisting of: a cellular telephonic network, a wireless local area network, and a vehicle wireless area network.

6. The bicycle electronic device of claim 1, further comprising:
   the electronic device configured to apply the position coordinates to one from a group consisting of: geo-fencing the human-powered vehicle, and tracking the human-powered vehicle.

7. An electronic device for a bicycle, comprising:
   a global positioning system receiver;
   a wireless communication unit; and
   a processing engine, coupled to the global positioning system receiver and the wireless communication unit, the processing engine configured to communicate position coordinates from the global positioning system receiver to a network via the wireless communication unit, wherein the electronic device is configured to attach to a bicycle, and wherein the electronic device is configured to track one from a group consisting of: riding habits, usage patterns, and bicycle performance.

8. The electronic device of claim 7, further comprising:
   a housing, dimensioned to contain the global positioning system receiver, the wireless communication unit and the processing engine, the housing configured to attach to a frame of the bicycle.

9. The electronic device of claim 7, further comprising:
   a housing, holding the global positioning system receiver, the wireless communication unit and the processing engine therewithin;
   the housing having a width approximately equal to a width of a bicycle frame tube, the housing having a length longer than the width; and
   the housing holding an antenna of the global positioning system receiver and an antenna of the wireless communication unit at opposed ends of the housing.

10. The electronic device of claim 7, further comprising:
a wireless handheld device, wherein the processing engine is configured to activate and deactivate an alarm function in response to one or more commands from the wireless handheld device.

11. The electronic device of claim 7, further comprising:
a movement sensor, coupled to the processing engine.

12. The electronic device of claim 7, further comprising:
a tamper sensor, coupled to the processing engine.

13. The electronic device of claim 7, further comprising:
a display monitor, coupled to the processing engine; and
the display monitor integrated with one from a group consisting of: a frame of the bicycle, and a housing containing the global positioning system receiver, the wireless communication unit and the processing engine.

14. A bicycle electronic device, comprising:
a global positioning system unit, configured to receive global positioning system data and to generate position coordinates from the global positioning system data;
a wireless communication unit, configured to couple to a network;
a processing device, configured to send the position coordinates to the network, via the wireless communication unit; and
the global positioning system unit, the wireless communication unit, and the processing device configured to attach on or within a bicycle;
wherein the electronic device is configured to track one from a group consisting of: riding habits, usage patterns, and bicycle performance.

15. The bicycle electronic device of claim 14, further comprising:
a housing, containing the global positioning system unit, the wireless communication unit and the processing device, the housing configured to attach to a frame of the bicycle, the housing further configured to attach a water bottle to the housing.

16. The bicycle electronic device of claim 14, wherein the processing device is integrated with at least one of the global positioning system unit and the wireless communication unit.

17. The bicycle electronic device of claim 14, further comprising:
a battery, coupled to the global positioning system unit, the wireless communication unit and the processing device; and
a battery management system configured to charge the battery via one from a group consisting of: a universal serial bus (USB) port, a hub dynamo of the bicycle, and energy harvesting from one or more pedals of the bicycle.

18. The bicycle electronic device of claim 14, further comprising:
the processing device configured to apply the position coordinates and a network coupling via the wireless communication unit, to one from a group consisting of: bike sharing, fleet management, activity monitoring, theft recovery, and tracking.

19. The bicycle electronic device of claim 14, further comprising:
an alarm unit, configured to produce an alarm sound that is one from a group consisting of: personalized to the bicycle, unique to a group of bicycles, and unique to each instance of the bicycle electronic device.

* * * * *